(12) United States Patent
Hirai et al.

(10) Patent No.: US 9,765,867 B2
(45) Date of Patent: Sep. 19, 2017

(54) ELECTROMECHANICAL ACTUATOR

(71) Applicant: NABTESCO CORPORATION, Tokyo (JP)

(72) Inventors: Masanori Hirai, Gifu-ken (JP); Masayoshi Ueyama, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/692,963

(22) Filed: Apr. 22, 2015

(65) Prior Publication Data

US 2015/0308549 A1 Oct. 29, 2015

(30) Foreign Application Priority Data

Apr. 23, 2014 (JP) ................. 2014-089490

(51) Int. Cl.
| | |
|---|---|
| *F16H 3/06* | (2006.01) |
| *F16H 25/20* | (2006.01) |
| *F16H 25/24* | (2006.01) |
| *F16H 25/22* | (2006.01) |

(52) U.S. Cl.
CPC ....... *F16H 25/205* (2013.01); *F16H 25/2021* (2013.01); *F16H 25/2454* (2013.01); *F16H 25/2204* (2013.01); *F16H 25/2247* (2013.01); *F16H 2025/204* (2013.01); *F16H 2025/2059* (2013.01); *F16H 2025/2065* (2013.01); *F16H 2025/2081* (2013.01)

(58) Field of Classification Search
CPC ............... F16H 25/205; F16H 25/2021; F16H 25/2454; F16H 25/2204; F16H 25/2247; F16H 2025/204
See application file for complete search history.

(56) References Cited

U.S. PATENT DOCUMENTS

| | | | | |
|---|---|---|---|---|
| 4,637,272 A | * | 1/1987 | Teske .................... | B64C 13/42 192/48.9 |
| 4,745,815 A | * | 5/1988 | Klopfenstein .......... | B64C 13/38 244/228 |
| 5,144,851 A | * | 9/1992 | Grimm .................... | B64C 13/36 74/89.26 |
| 5,398,780 A | * | 3/1995 | Althof .................. | B64D 41/007 185/39 |
| 2006/0101930 A1 | * | 5/2006 | Mock .................... | F16H 25/20 74/89.23 |

(Continued)

*Primary Examiner* — Zakaria Elahmadi

(74) *Attorney, Agent, or Firm* — Pillsbury Winthrop Shaw Pittman LLP

(57) ABSTRACT

An electromechanical actuator includes a first electric motor, a first motion conversion mechanism, a second motion conversion mechanism, and a rotation restriction mechanism for the second motion conversion mechanism. The first motion conversion mechanism includes a first member that is rotated by an output of the first electric motor and a second member that is fastened to the first member. The second motion conversion mechanism includes a third member that is movable integrally with the first member and a fourth member that is fastened to the third member. The rotation restriction mechanism is configured to be capable of selectively restricting and allowing rotation of the fourth member in accordance with movement of the third member.

16 Claims, 20 Drawing Sheets

(56) References Cited

U.S. PATENT DOCUMENTS

| | | | |
|---|---|---|---|
| 2006/0117880 A1* | 6/2006 | Osterlanger | B62D 5/0427 74/89.23 |
| 2007/0051847 A1* | 3/2007 | Quitmeyer | F16H 25/205 244/99.2 |
| 2012/0234117 A1* | 9/2012 | Oswald | E21B 41/0007 74/89.39 |
| 2014/0298980 A1* | 10/2014 | Cyren | F16H 25/2015 91/41 |
| 2015/0114151 A1* | 4/2015 | Hirai | F16H 25/205 74/89.25 |

* cited by examiner

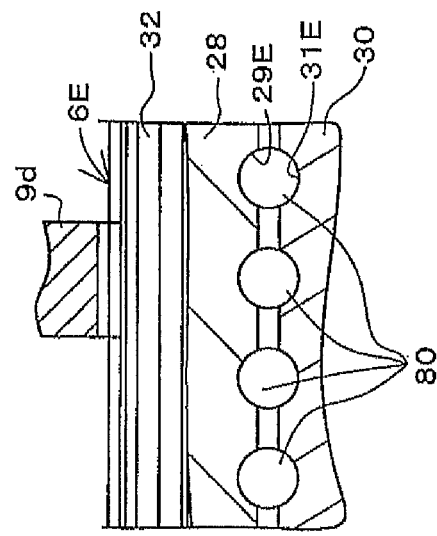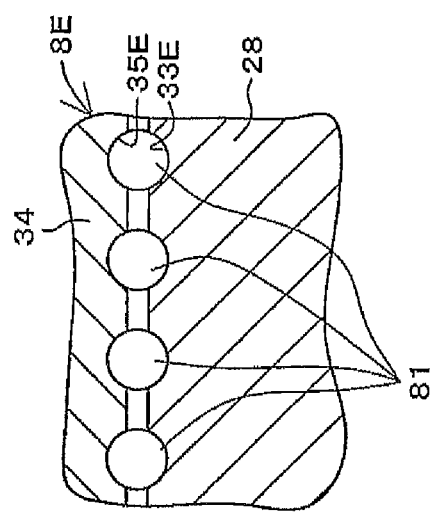
Fig.19

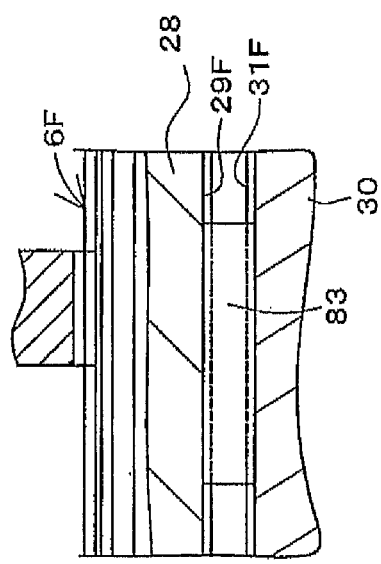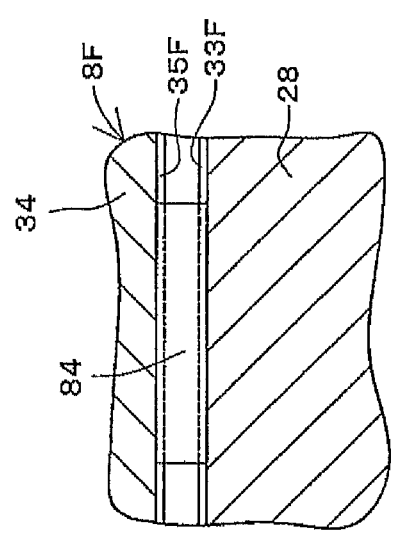
Fig.20

ELECTROMECHANICAL ACTUATOR

CROSS-REFERENCE TO RELATED APPLICATION

This application is based on and claims priority from Japanese Patent Application No. 2014-089490, filed on Apr. 23, 2014, the entire contents of which are incorporated herein by reference.

BACKGROUND OF THE INVENTION

The present invention relates to an electromechanical actuator that includes a motion conversion mechanism, such as a screw mechanism, and converts a rotational drive force, which is output from an electric motor, to a linear drive force to output the linear drive force.

A conventional electromechanical actuator includes an electric motor and a screw mechanism and used in various fields, such as aircraft. Such an electromechanical actuator converts a rotational drive force, which is output from the electric motor, to a linear drive force by means of the screw mechanism and outputs the linear drive force. The electromechanical actuator moves an output portion in a straight line relative to a housing to drive a device. The electromechanical actuator is easily maintained compared to a hydraulic actuator, which is driven with the supply of hydraulic oil. This is the advantage of the electromechanical actuator.

U.S. Patent Application Publication No. 2007/0051847 describes an electromechanical actuator that includes a ball screw mechanism and two electric motors so that a rod linearly moves. Each electric motor is coupled to the ball screw mechanism. The ball screw mechanism converts rotation, which is output from the electric motors, to a linear movement of the rod (output portion).

U.S. Pat. No. 5,144,851 describes an electromechanical actuator that includes an electric motor, a planetary gear mechanism, and two ball screw mechanisms. One of the ball screw mechanisms surrounds the other ball screw mechanism. This structure allows an output of the electric motor to be selectively distributed to the ball screw mechanisms through the planetary gear mechanism. When the electric motor rotates one of the ball screw mechanisms, the rod (output portion) moves in an axial direction.

U.S. Pat. No. 4,637,272 describes an electromechanical actuator that includes a ball screw and ball nuts. Each ball nut can be rotated by an output of a corresponding electric motor. This allows the ball screw (output portion) to move in an axial direction when any one of the electric motors is driven.

SUMMARY OF THE INVENTION

In the above electromechanical actuators, the screw mechanism may be stuck (jammed) due to galling or seizure. Such jamming hinders the output portion from moving forward or backward relative to the housing.

However, U.S. Patent Application Publication No. 2007/0051847 describes a structure that includes only one ball screw mechanism serving as a screw mechanism. Thus, jamming hinders the output portion from moving forward or backward relative to the housing.

U.S. Pat. No. 5,144,851 describes a structure in which the planetary gear mechanism distributes an output of the electric motor to two screw mechanisms (ball screw mechanisms). In this structure, when one of the ball screw mechanisms is jammed, the other ball screw mechanism may be operated to move the rod in an axial direction. However, the structure described in U.S. Pat. No. 5,144,851 is not configured to actively control to which ball screw the electric motor output is distributed. In this case, it is more desirable to distribute the output to the ball screw so that the rod may move in a further assured manner even when jamming occurs.

The structure described in U.S. Pat. No. 4,637,272 includes clutch mechanisms in addition to a number of electric motors. Each clutch mechanism connects and disconnects a force transmission line between a corresponding electric motor and a corresponding ball screw mechanism. Thus, the structure is complicated.

Accordingly, it is an object of the present invention to provide an electromechanical actuator that has a simple structure and moves an operating portion, such as a rod, in a further assured manner even when jamming occurs.

To achieve the above object, one aspect of the present invention is an electromechanical actuator that includes a first electric motor, a first motion conversion mechanism, a second motion conversion mechanism, and a rotation restriction mechanism for the second motion conversion mechanism. The first motion conversion mechanism includes a first screw and a first nut that is fastened to the first screw. The second motion conversion mechanism includes a second screw and a second nut that is fastened to the second screw. The first motion conversion mechanism includes a first member and a second member. The first member includes one of the first screw and the first nut. The first member is rotated by an output of the first electric motor. The second member includes the other of the first screw and the first nut. The second motion conversion mechanism includes a third member and a fourth member. The third member includes one of the second screw and the second nut. The third member is movable integrally with the first member. The fourth member includes the other of the second screw and the second nut. The rotation restriction mechanism is configured to be capable of selectively performing an operation that restricts rotation of the fourth member when the third member moves, and an operation that allows rotation of the fourth member when the third member moves.

Each motion conversion mechanism may be formed using one of a roller screw and a ball screw.

Preferably, the electromechanical actuator further includes a gear that is rotated when receiving the output of the first electric motor, and teeth that are configured to mesh with the gear and rotate integrally with the first member. The teeth form splines extending in an axial direction of the first member.

Preferably, the electromechanical actuator further includes a rotation stop mechanism that restricts rotation of the second member.

Preferably, the electromechanical actuator further includes a hollow first shaft. The first shaft includes the first member and the third member that are arranged in a straight line.

More preferably, the electromechanical actuator further includes a second shaft that is inserted into the first shaft and a third shaft that surrounds the first shaft. The first nut that functions as the first member and the first screw that functions as the second member are respectively arranged on an inner circumference of the first shaft and an outer circumference of the second shaft. The second screw that functions as the third member and the second nut that functions as the fourth member are respectively arranged on an outer circumference of the first shaft and an inner circumference of the third shaft.

Preferably, the electromechanical actuator further includes a housing that accommodates the fourth member and a bearing unit that is held by the housing and supports the fourth member. The bearing unit includes a thrust bearing and a radial bearing that are coaxial with the fourth member.

Preferably, the electromechanical actuator further includes a second electric motor that is capable of driving and rotating the fourth member.

More preferably, the electromechanical actuator further includes a rotation restriction mechanism for the first motion conversion mechanism. The rotation restriction mechanism for the first motion conversion mechanism is arranged to restrict rotation of the first member.

Preferably, the rotation restriction mechanism for the second motion conversion mechanism includes a brake mechanism that is capable of restricting rotation of the fourth member.

More preferably, the brake mechanism of the rotation restriction mechanism for the second motion conversion mechanism includes a torque limiter that is capable of restricting rotation of the fourth member when torque acting on the fourth member is less than a predetermined value. The torque limiter is configured to be capable of changing the predetermined value.

More preferably, the torque limiter includes two opposing members, which are opposed to each other, and a pressing force adjustment member. The two opposing members are coupled to the fourth member and the pressing force adjustment member. The two opposing members are configured to be coupled so that transmission of force between the two opposing members is allowed when torque acting between the two opposing members is less than a predetermined value. The two opposing members are configured to rotate freely relative to each other when the torque acting between the two opposing members is greater than or equal to the predetermined value. The pressing force adjustment member is configured to be capable of adjusting a thrust load acting between the two opposing members.

More preferably, the electromechanical actuator further includes a spring member located between one of the two opposing members and the pressing force adjustment member. The pressing force adjustment member is configured to be capable of adjusting a pressing force that presses the spring member against the opposing member.

Preferably, the pressing force adjustment member includes a solenoid.

Preferably, the rotation restriction mechanism for the second motion conversion mechanism further includes a second motion conversion mechanism torque limiter that is located between the first electric motor and the fourth member. The second motion conversion mechanism torque limiter includes two second opposing members that are capable of transmitting force to the first electric motor and the fourth member. The two second opposing members are configured to be coupled so that transmission of force between the two second opposing members is allowed when torque acting between the first electric motor and the fourth member is less than a predetermined value. The two second opposing members are configured to rotate freely relative to each other when the torque acting between the first electric motor and the fourth member is greater than or equal to the predetermined value.

More preferably, the electromechanical actuator further includes a first motion conversion mechanism torque limiter located between the first electric motor and the first member. The first motion conversion mechanism torque limiter includes two first opposing members, one of which is coupled to the first electric motor and the other of which is coupled to the first member. The two first opposing members are configured to be coupled so that transmission of force between the first opposing members is allowed when torque acting between the first electric motor and the first member is less than a predetermined value. The two first opposing members are configured to rotate freely relative to each other when the torque acting between the first electric motor and the first member is greater than or equal to the predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 19 is a diagram showing an electromechanical actuator according to a modified example when a ball screw mechanism is used as a motion conversion mechanism; and FIG. 20 is a diagram showing an electromechanical actuator according to another modified example when a roller screw mechanism is used as a motion conversion mechanism.

DETAILED DESCRIPTION OF THE PREFERRED EMBODIMENTS

Embodiments of the present invention will now be described with reference to the drawings. The following embodiments each describe an example in which an electromechanical actuator is arranged in a flight control surface drive mechanism, which drives a flight control surface of an aircraft. However, the present invention is not limited to the aspects illustrated in the following embodiments and thus may be applied widely. More specifically, the present invention may be widely applied to an electromechanical actuator that includes a motion conversion mechanism and converts a rotational drive force, which is output from an electric motor, to a linear drive force to output the linear drive force.

First Embodiment

Figure 1:
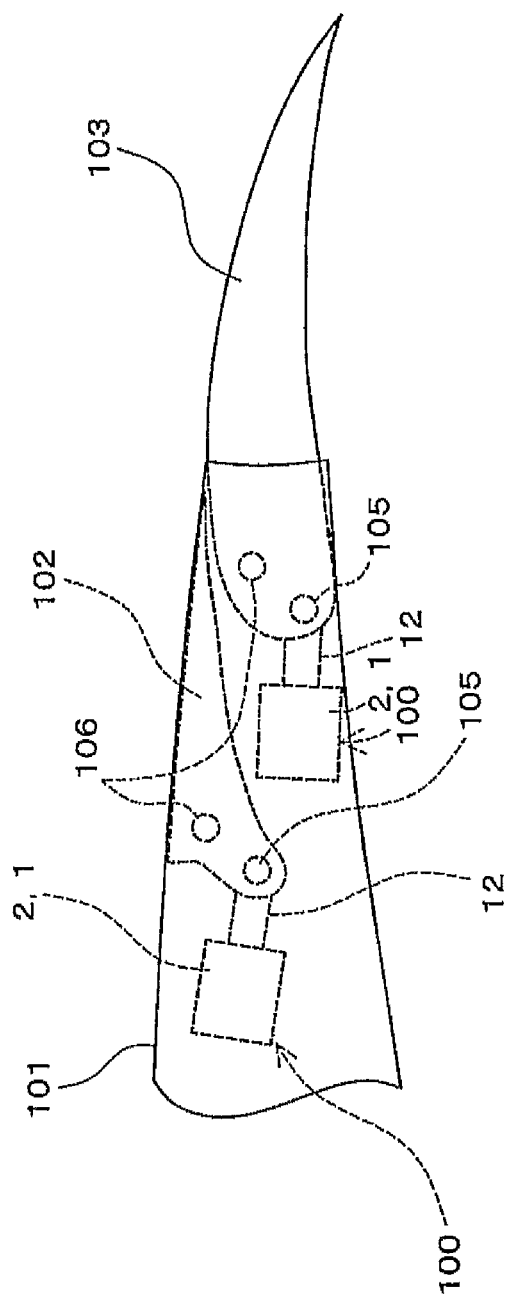
FIG. 1 is a schematic diagram showing electromechanical actuators according to a first embodiment of the present invention that are each coupled to a flight control surface of an aircraft.

FIG. 1 is a schematic diagram showing electromechanical actuators 1 according to a first embodiment of the present invention that are each coupled to a flight control surface 102 or 103 of an aircraft. FIG. 1 does not show main components of the aircraft. FIG. 1 schematically shows a portion of a wing 101, the flight control surface 102, and the flight control surface 103. In the present embodiment, the wing 101 is configured as a main wing of the aircraft. The flight control surface 102 is configured as a spoiler. The flight control surface 103 is configured as, for example, an aileron. Each of the flight control surfaces 102, 103 is driven by one of the electromechanical actuators 1. Each electromechanical actuator 1 may be used to drive a rudder or an elevator of the empennage. FIG. 1 shows a rear end portion of the wing 101 as viewed in a lateral direction of the aircraft. Additionally, FIG. 1 shows only schematic outlines of the wing 101 and the flight control surfaces 102, 103.

Flight Control Surface Drive Mechanism

To describe the electromechanical actuators 1, aircraft flight control surface drive mechanisms 100, to each of which one of the electromechanical actuators 1 is applied, will now be described. As shown in FIG. 1, the flight control surface drive mechanisms 100 are arranged in the wing 101 of the aircraft. The flight control surface drive mechanisms 100 are used for driving the flight control surfaces 102, 103 of the aircraft. Each flight control surface drive mechanism 100 includes a rotation shaft (not shown), a pivot shaft 105, and one of the electromechanical actuators 1.

The rotation shafts are arranged in the wing 101. Each electromechanical actuator 1 includes a housing 2, which is rotatably coupled to one of the rotation shafts. Thus, the electromechanical actuators 1 are supported by the wing 101 to be pivotal about the respective rotation shafts.

The pivot shafts 105 are each arranged in one of the flight control surfaces 102, 103. Each electromechanical actuator 1 includes an output portion 12, one end of which is rotatably coupled to the corresponding one of the flight control surfaces 102, 103. The flight control surfaces 102, 103 are each rotatably supported by a fulcrum shaft 106. Thus, the flight control surfaces 102, 103 are supported by the wing 101 to be pivotal about the respective fulcrum shafts 106.

In each electromechanical actuator 1, the output portion 12 projects from the housing 2 and is movable relative to the housing 2. More specifically, the output portion 12 is configured to be capable of extending and retracting relative to the housing 2. The configuration of the electromechanical actuator 1 for the flight control surface 102 is the same as that for the flight control surface 103. Thus, the configuration of the electromechanical actuator 1 for the flight control surface 102 will be described below, and the explanation of the electromechanical actuator 1 for the flight control surface 103 is omitted.

Figure 2:
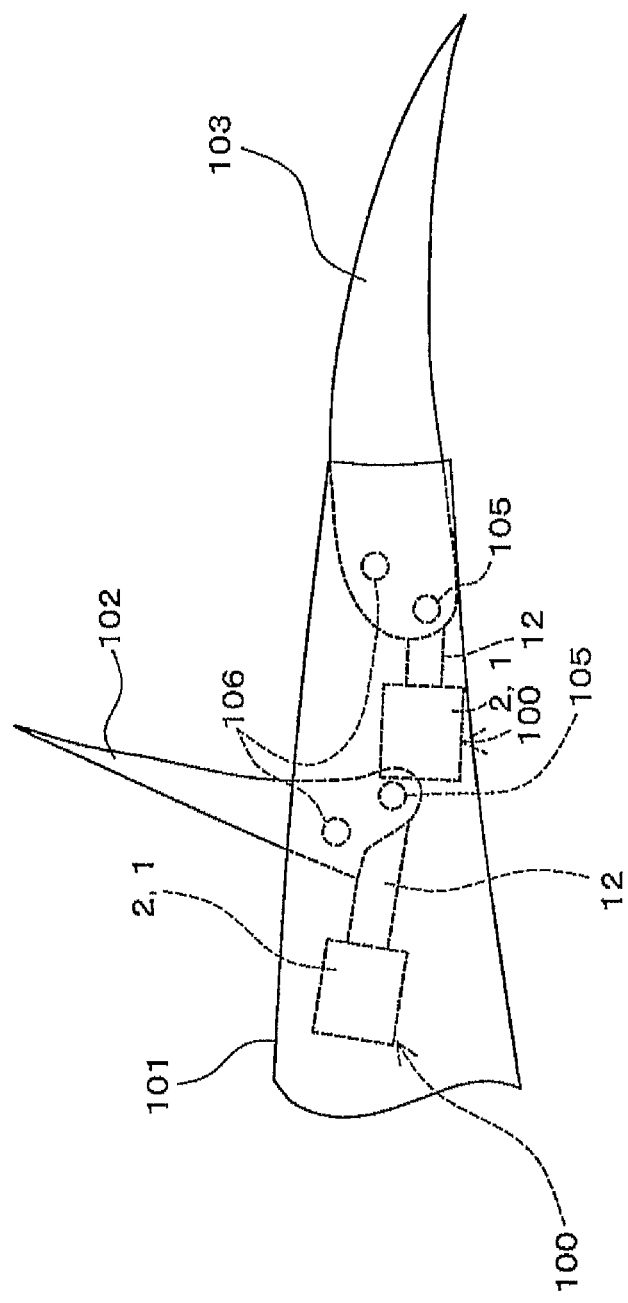
FIG. 2 is a schematic diagram showing a state in which one of the flight control surfaces has been driven from the state shown in FIG. 1 by corresponding one of the electromechanical actuators.

FIG. 2 is a schematic diagram showing a state in which the flight control surface 102 has been driven from the state shown in FIG. 1 by the electromechanical actuator 1 of one of the flight control surface drive mechanisms 100. FIG. 1 shows a state of when the output portion 12 is retracted to the maximum into the housing 2. On the other hand, FIG. 2 shows a state of when the output portion 12 is extended and projected from the housing 2. As shown in FIGS. 1 and 2, the operation of the electromechanical actuator 1 drives the flight control surface 102. The flight control surface 102 is driven to pivot about the fulcrum shaft 106 relative to the wing 101.

The flight control surface drive mechanism 100 shown in FIG. 1 may further include a reaction link. When an output from the electromechanical actuator 1 is transmitted to the flight control surface 102, the output may generate a reaction force from the flight control surface 102. In this case, the reaction link supports the reaction force. The reaction link has one end coupled to the rotation shaft (not shown) and the other end coupled to the fulcrum shaft 106. The arrangement of the reaction link hinders a load acting on the flight control surface 102, which is movable, from directly affecting the wing 101, which is fixed.

Electromechanical Actuator Configuration

Figure 3:
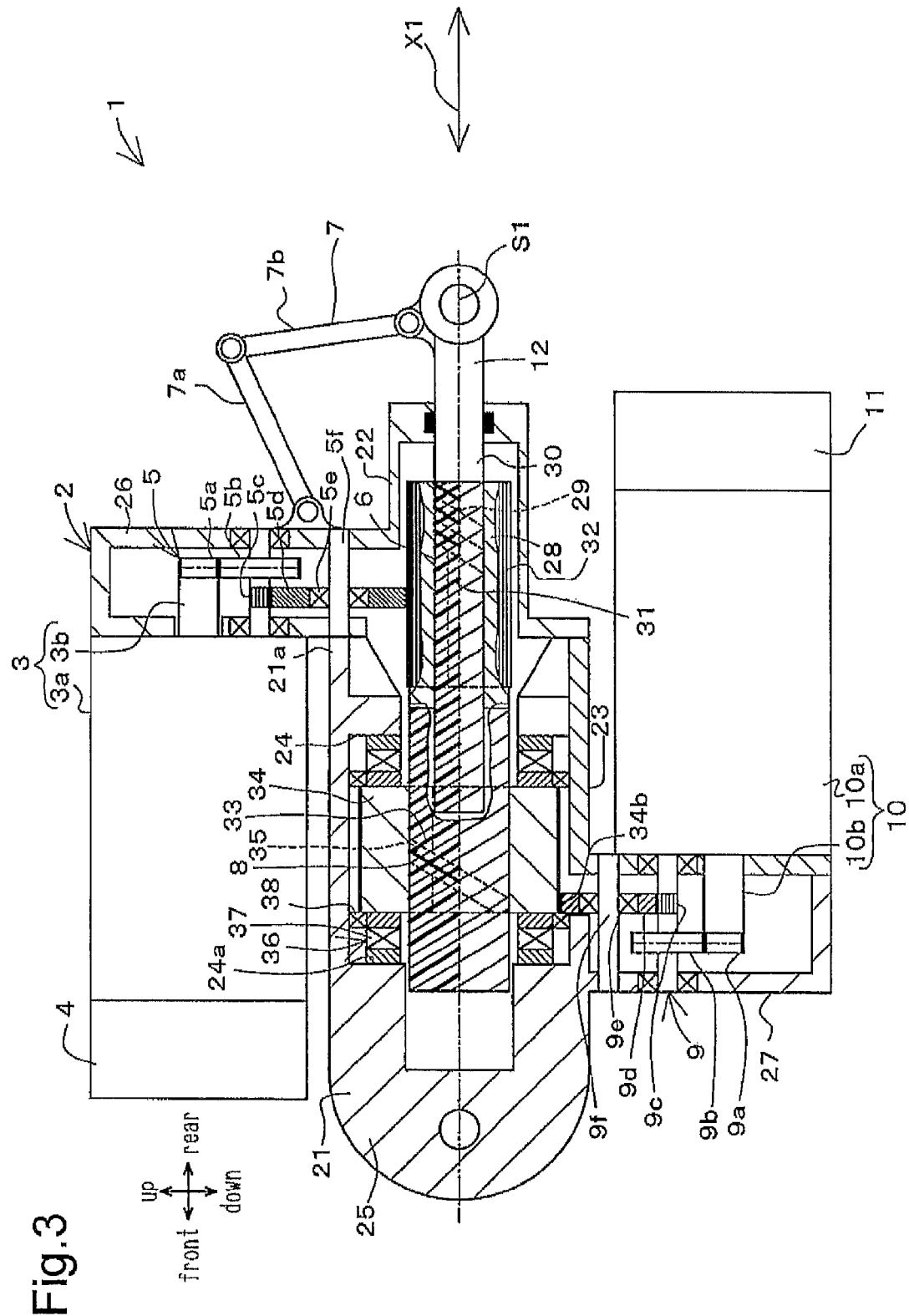
FIG. 3 is a partially cross-sectional schematic diagram showing one of the electromechanical actuators.

FIG. 3 is a partially cross-sectional schematic diagram showing the electromechanical actuator 1. As described above, the electromechanical actuator 1 is configured as an actuator that drives the flight control surface 102. FIG. 3 does not show the flight control surface 102 and the pivot shaft 105.

Referring to FIG. 3, the electromechanical actuator 1 includes the housing 2, a first electric motor 3, a first brake mechanism 4, a first force transmission mechanism 5, a first motion conversion mechanism 6, a rotation stop mechanism 7, a second motion conversion mechanism 8, a second force transmission mechanism 9, a second electric motor 10, and a second brake mechanism 11.

The first electric motor 3, the first brake mechanism 4, the second electric motor 10, and the second brake mechanism 11 operate when driven by a controller (not shown).

For the sake of brevity, in each drawing, the direction of an arrow indicated with "front" refers to a front side or frontward. The direction of an arrow indicated with "rear" refers to a rear side or rearward.

The housing 2 is a hollow member that is a combination of three components in the present embodiment.

Namely, the housing 2 includes a first housing portion 21, a second housing portion 22, and a cover 23.

The first housing portion 21 has a tubular shape. The first housing portion 21 includes a groove 24 in a frontward portion of the inner circumference. The groove 24 is annular the center of which is on a center axis S1, which will be described later. The first housing portion 21 includes a rear end 21a opening rearward. The rear end 21a is coupled to the second housing portion 22. The second housing portion 22 serves as a basal housing portion formed separately from the first housing portion 21. The cover 23 covers the first housing portion 21. The cover 23 is shaped so that the cover 23 seals an opening that is formed in a lower portion of the first housing portion 21 and located at the rear end side.

When the first housing portion 21, the second housing portion 22, and the cover 23 are combined to form the housing 2, the housing 2 includes a housing body 25, a first projection 26, and a second projection 27.

The housing body 25 is tubular and accommodates the first motion conversion mechanism 6 and the second motion conversion mechanism 8. When accommodated in the housing body 25, the first motion conversion mechanism 6 and the second motion conversion mechanism 8 are arranged around the center axis S1. The center axis S1 of the present embodiment extends in the front-rear direction. The groove 24 of the housing 2 is formed in the housing body 25. The first projection 26 projects from a rearward portion of the housing body 25.

The first projection 26 is a hollow portion extending from the housing body 25 in a direction orthogonal to the center axis S1 (or in the radial direction). The first projection 26 accommodates a distal portion of an output shaft 3b (described later) of the first electric motor 3 and the first force transmission mechanism 5. The second projection 27 is arranged at a location separated from the first projection 26 in the front-rear direction.

The second projection 27 is a hollow portion extending from the housing body 25 in a direction orthogonal to the center axis S1. The second projection 27 accommodates a distal portion of an output shaft 10b (described later) of the second electric motor 10 and the second force transmission mechanism 9. In the present embodiment, the first projection 26 projects upward from the housing body 25, and the second projection 27 projects downward from the housing body 25. The first electric motor 3 is coupled to the first projection 26.

The first electric motor 3 is arranged to move the output portion 12 in the front-rear direction. The first electric motor 3 is, for example, a brushless motor, and controlled, for example, using pulse width modulation (PWM).

The first electric motor 3 includes a motor housing 3a and the output shaft 3b.

The motor housing 3a is tubular and accommodates a rotor and a stator (not shown). The motor housing 3a is fixed to the first projection 26. The motor housing 3a supports the output shaft 3b. The output shaft 3b projects from the rear of the motor housing 3a into the first projection 26 of the housing 2. The output shaft 3b is configured to be braked by the first brake mechanism 4.

The first brake mechanism 4 is an example of a "rotation restriction mechanism for first motion conversion mechanism" of the present invention. The first brake mechanism 4 is arranged to restrict rotation of a first member 29 (first shaft 28), which will be described later. The first brake mechanism 4 is, for example, an electromagnetic clutch device. The first brake mechanism 4 only needs to be configured to be capable of restricting the rotation of the first member 29 (output shaft 3b). The first brake mechanism 4 is located, for example, at the front of the motor housing 3a, and supported by the motor housing 3a.

The output of the first electric motor 3 is transmitted to the first motion conversion mechanism 6 through the first force transmission mechanism 5. The first force transmission mechanism 5 is, for example, a reduction gear mechanism. In the present embodiment, the output (torque) from the first electric motor 3 is amplified through the first force transmission mechanism 5 and transmitted to the first motion conversion mechanism 6.

The first force transmission mechanism 5 includes four gears 5a, 5b, 5c, 5d.

The gears 5a to 5d are rotatable relative to the housing 2. The gear 5a is fixed to the output shaft 3b of the first electric motor 3 and capable of rotating integrally with the output shaft 3b. The gear 5a meshes with the gear 5b. The gear 5b rotates integrally with the gear 5c. The gear 5c meshes with the gear 5d. The gear 5d is a spur gear. The gear 5d is rotatably supported by a bearing 5e on a support shaft 5f. The support shaft 5f is fixed to the first projection 26. The gear 5d rotates by receiving the output from the first electric motor 3. The rotation of the gear 5d is transmitted to a spur teeth portion 32 (described later) of the first motion conversion mechanism 6.

The first motion conversion mechanism 6 is arranged to function as a motion conversion mechanism that converts the rotary motion of the output shaft 3b of the first electric motor 3 to the linear motion of the output portion 12. The first motion conversion mechanism 6 is arranged in a rearward portion of the housing body 25.

The first motion conversion mechanism 6 includes a first shaft 28, a first member 29 functioning as a first nut, a second shaft 30, and a second member 31 functioning as a first screw that is fastened to the first member 29.

In the present embodiment, the first member 29 functions as an input-side member that is rotated by the output of the first electric motor 3. The second member 31 is arranged integrally with the output portion 12. The second member 31 functions as an output-side member that moves in an axial direction X1 (direction in which the center axis S1 extends) relative to the first member 29 in accordance with the rotational force of the first member 29.

The first member 29 is formed in an inner circumference of the first shaft 28. The first shaft 28 is a hollow cylindrical component. The first shaft 28 is located in the housing body 25. The axis of the first shaft 28 is aligned with the center axis S1. The spur teeth portion 32 (spline teeth) is formed on a rear portion of the outer circumference of the first shaft 28.

The spur teeth portion 32 is an example of "teeth configured to rotate integrally with the first member (first nut member)" of the present invention. The spur teeth portion 32 includes spline teeth formed around the outer circumference of the first shaft 28. That is, the spur teeth portion 32 includes a plurality of spur teeth (spline teeth) extending parallel in the axial direction X1. The spur teeth portion 32 meshes with the gear 5d of the first force transmission mechanism 5. This structure allows the first shaft 28 to move relative to the housing 2 in the axial direction X1 while keeping the spur teeth portion 32 meshed with the gear 5d. Instead of such a structure in which the spur teeth portion 32 forms splines on the first shaft 28, a linear guide may be arranged on the first shaft 28. In this case, a gear is also arranged so that the gear is configured to be capable of rotating integrally with the first shaft 28 and movable in the axial direction X1 relative to the first shaft 28 using the linear guide. The first member 29 is formed on a rear portion of the inner circumference of the first shaft 28.

The first member 29 and the second member 31 each are a screw or a nut. More specifically, in the present embodiment, the first member 29 and the second member 31 are configured to be in direct contact with each other. The first member 29 includes a female thread. The first member 29 surrounds the second member 31.

The second member 31 includes a male thread. The second member 31 is fastened to the first member 29 and linearly moves when the first member 29 rotates. At least a portion of the second member 31 is inserted into an inner space of the first member 29. The second member 31 is formed on the second shaft 30.

The second shaft 30 is a round rod-shaped component. The second shaft 30 is located in the housing body 25 of the housing 2. The axis of the second shaft 30 is aligned with the center axis S1. The second shaft 30 is inserted in the first shaft 28. The second shaft 30 extends through a rear end of the housing 2 and is rotatably supported by the rear end of the housing 2. The output portion 12 is formed on a rear portion of the second shaft 30. More specifically, the second member 31 is formed integrally with the output portion 12. The rotation stop mechanism 7 is coupled to the second shaft 30.

The rotation stop mechanism 7 restricts rotation of the second shaft 30 (second member 31) around the center axis S1. The rotation stop mechanism 7 includes two links 7a, 7b.

The link 7a is a rod-shaped component. One end of the link 7a is coupled to the first projection 26 of the housing 2 by a link shaft and capable of rotating relative to the first projection 26. The other end of the link 7a is coupled to one end of the link 7b by a link shaft and capable of rotating relative to the end of the link 7b. The link 7b is a rod-shaped component. The other end of the link 7b is coupled to the output portion 12 of the second shaft 30 by a link shaft and capable of rotating relative to the output portion 12.

In the above structure, the rotation stop mechanism 7 restricts rotation of the second shaft 30 while allowing the second shaft 30 to move in the axial direction X1. The rotation stop mechanism 7 may be replaced by a different rotation stop mechanism, such as one including a key or splines. The second member 31 is formed, for example, on a front portion of the outer circumference of the second shaft 30.

The male thread of the second member 31 is formed in a helical manner and fastened (thread-coupled) to the first member 29. The first member 29 and the second member 31 are coupled to each other so that a regular operation and a reverse operation may be performed. The regular operation refers to the axial movement of the second member 31 when the first member 29 rotates. The reverse operation refers to the rotation of the first member 29 when the second member 31 moves axially.

In the above structure, when the first electric motor 3 is driven, the first member 29 rotates. The rotation of the first member 29 is transmitted to the second member 31. This moves the second member 31 (second shaft 30) in the axial direction X1. The first motion conversion mechanism 6 and the second motion conversion mechanism 8 are arranged in a straight line.

When the first motion conversion mechanism 6 normally operates, the second motion conversion mechanism 8 allows the first electric motor 3 to move the output portion 12 (second shaft 30) in the axial direction. When an abnormality, such as jamming, occurs in the first motion conversion mechanism 6, the second motion conversion mechanism 8 allows force from an outside of the electromechanical actuator 1 (external force) to move the output portion 12 in the axial direction.

The second motion conversion mechanism 8 includes the first shaft 28, a third member 33 functioning as a second screw formed in the first shaft 28, a third shaft 34, and a fourth member 35 functioning as a second nut formed in the third shaft 34. More specifically, the first motion conversion mechanism 6 and the second motion conversion mechanism 8 share the first shaft 28. The first motion conversion mechanism 6 and the second motion conversion mechanism 8 have the same thread direction. In the present embodiment, the first motion conversion mechanism 6 and the second motion conversion mechanism 8 are right-hand threaded.

The third member 33 and the fourth member 35 each are a screw or a nut. More specifically, in the present embodiment, the third member 33 and the fourth member 35 are configured to be in direct contact with each other.

The third member 33 and the first member 29 are arranged in a straight line and movable integrally with each other. The third member 33 is formed on a front portion of the outer circumference of the first shaft 28. The third member 33 includes a male thread. The male thread of the third member 33 is a groove formed in a helical manner. The third member 33 is surrounded by the fourth member 35.

The fourth member 35 is formed in the third shaft 34. The third shaft 34 is a tubular component. The third shaft 34 is located in the housing body 25 of the housing 2. The axis of the third shaft 34 is aligned with the center axis S1. The third shaft 34 surrounds the first shaft 28. The fourth member 35 is arranged in an inner circumference of the third shaft 34. The third shaft 34 is accommodated in the groove 24 of the housing body 25. The third shaft 34 is supported by a bearing unit 36.

The bearing unit 36, which is held by the housing 2 and coaxial with the fourth member 35, supports the third shaft 34 (fourth member 35). The bearing unit 36 includes two thrust bearings 37 and two radial bearings 38.

Each thrust bearing 37 is configured to receive a thrust load acting in the axial direction X1. Each thrust bearing 37 is held in the groove 24 of the housing body 25. The third shaft 34 is supported by the two thrust bearings 37 on two opposite side surfaces 24a of the groove 24. The third shaft 34 is also supported, in the groove 24, by the two radial bearings 38, each of which is located proximate to one of the two thrust bearings 37. Each radial bearing 38 receives a radial load from the third shaft 34. Each thrust bearing 37 may be replaced by a bearing capable of supporting a thrust load and a radial load (e.g., angular bearing).

The above structure restricts the movement of the third shaft 34 in the axial direction X1 relative to the housing body 25. Also, the third shaft 34 is supported by the housing body 25 and capable of rotating around the center axis S1. The fourth member 35 is formed in the inner circumference of the third shaft 34. The fourth member 35 is fastened to the third member 33.

The fourth member 35 includes a female thread. The female thread of the fourth member 35 is helical and meshed with the third member 33. The third member 33 and the fourth member 35 are coupled to each other so that a regular operation and a reverse operation may be performed. The regular operation refers to the axial movement of the third member 33 when the fourth member 35 rotates. The reverse operation refers to the rotation of the fourth member 35 when the third member 33 moves axially. The second motion conversion mechanism 8 is coupled to the second electric motor 10 via the second force transmission mechanism 9.

The second electric motor 10 is configured to provide the rotational drive force (output) to the fourth member 35 of the second motion conversion mechanism 8 during a speed summing operation, which will be described later. The second electric motor 10 is, for example, a brushless motor similar to that of the first electric motor 3. The second electric motor 10 is controlled, for example, using pulse width modulation (PWM).

The second electric motor 10 includes a motor housing 10*a* and an output shaft 10*b*.

The motor housing 10*a* is tubular and accommodates a rotor and a stator (not shown). The motor housing 10*a* is fixed to the cover 23. The motor housing 10*a* supports the output shaft 10*b*. The output shaft 10*b* projects from the front of the motor housing 10*a* into the second projection 27 of the housing 2. The output shaft 10*b* is configured to be braked by the second brake mechanism 11.

The second brake mechanism 11 is an example of a "rotation restriction mechanism for second motion conversion mechanism" of the present invention. The second brake mechanism 11 is configured to selectively perform an operation that restricts the rotation of the fourth member 35 when the third member 33 linearly moves, and an operation that allows the rotation of the fourth member 35 when the third member 33 linearly moves.

The second brake mechanism 11 is, for example, an electromagnetic clutch device. The second brake mechanism 11 only needs to be configured to be capable of restricting the rotation of the output shaft 10*b*. The second brake mechanism 11 is located, for example, at the rear of the motor housing 10*a*, and supported by the motor housing 10*a*.

The output of the second electric motor 10 is transmitted to the second motion conversion mechanism 8 through the second force transmission mechanism 9. The second force transmission mechanism 9 is, for example, a reduction gear mechanism. In the present embodiment, the output (torque) from the second electric motor 10 is amplified through the second force transmission mechanism 9 and transmitted to the second motion conversion mechanism 8.

The second force transmission mechanism 9 includes four gears 9*a*, 9*b*, 9*c*, 9*d*.

The gears 9*a* to 9*d* are rotatable relative to the housing 2. The gear 9*a* is fixed to the output shaft 10*b* of the second electric motor 10 and capable of rotating integrally with the output shaft 10*b*. The gear 9*a* meshes with the gear 9*b*. The gear 9*b* rotates integrally with the gear 9*c*. The gear 9*c* meshes with the gear 9*d*. The gear 9*d* is a spur gear. The gear 9*d* is rotatably supported by a bearing 9*e* on a support shaft 9*f*. The support shaft 9*f* is fixed to the second projection 27. The rotation of the gear 5*d* is transmitted to teeth 34*b*, which are formed on the outer circumference of the third shaft 34. In the above structure, the output of the second electric motor 10 or the braking force generated by the second brake mechanism 11 is transmitted to the third shaft 34.

The schematic structure of the electromechanical actuator 1 has been described. The operation of the electromechanical actuator 1 will now be described. More specifically, (1) a normal operation using the first electric motor 3, (2) a normal operation using the second electric motor 10, (3) a speed summing operation, (4) an operation when the first motion conversion mechanism 6 is jammed, and (5) an operation when the second motion conversion mechanism 8 is jammed will be described.

(1) Normal Operation Using First Electric Motor

Figure 4:
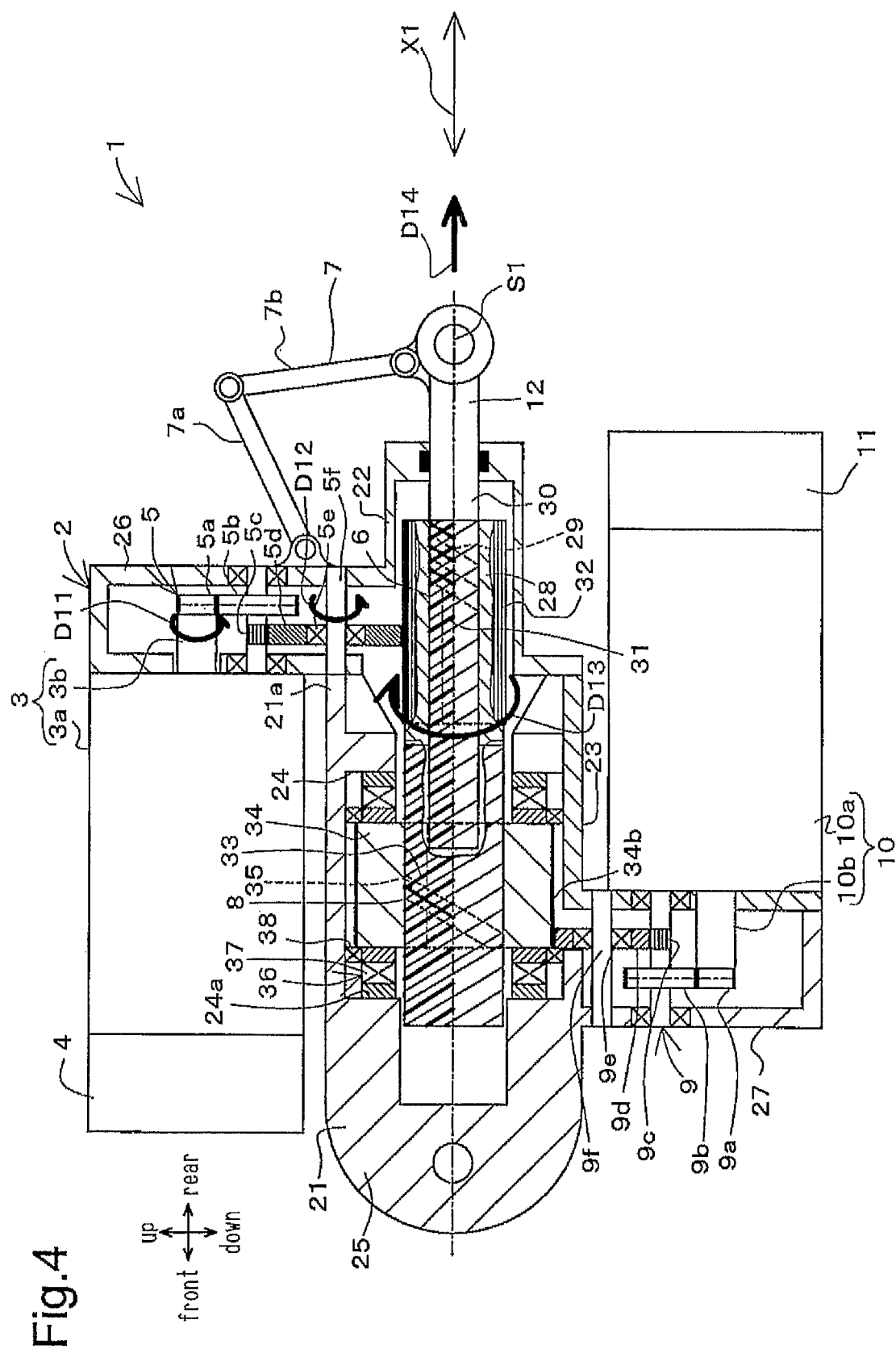
FIG. 4 is a diagram illustrating the normal operation of the electromechanical actuator when a first electric motor is driven.

FIG. 4 is a diagram illustrating the normal operation of the electromechanical actuator 1 when the first electric motor 3 is driven. In the following description, arrows indicate examples of directions in which the components of the electromechanical actuator 1 move. Referring to FIG. 4, in the normal operation using the first electric motor 3, the first motion conversion mechanism 6 operates in a state that the third shaft 34 of the second motion conversion mechanism 8 is locked. This moves the output portion 12 in the axial direction X1.

More specifically, the controller locks the output shaft 10*b* of the second electric motor 10 using the second brake mechanism 11. Thus, the output shaft 10*b* of the second electric motor 10 cannot rotate. This locks the second force transmission mechanism 9, which is coupled to the second electric motor 10, and the third shaft 34. That is, the rotation of the third shaft 34 is restricted.

Under this situation, when the first electric motor 3 operates, the rotation (e.g., indicated by the arrow D11 in FIG. 4) of the output shaft 3*b* of the first electric motor 3 is transmitted to the first shaft 28 through the first force transmission mechanism 5. One example of a direction in which the first force transmission mechanism 5 rotates is indicated by the arrow D12 in FIG. 4. Consequently, the first shaft 28 rotates around the center axis S1 in the direction indicated by the arrow D13 in FIG. 4. When the first shaft 28 rotates, the rotation of the first member 29 is converted to the linear movement of the second member 31. This moves the output portion 12, which is formed integrally with the second member 31, in the axial direction X1 (direction indicated by the arrow D14 in FIG. 4).

In this case, the rotation of the fourth member 35 (third shaft 34) is restricted. Thus, when the first shaft 28 rotates, the third member 33 rotates relative to the fourth member 35 (third shaft 34) and moves in the axial direction X1. More specifically, the output portion 12 moves in the axial direction X1 by the total amount of the axial movement of the output portion 12 when the first member 29 of the first motion conversion mechanism 6 rotates relative to the second member 31, and the axial movement of the first shaft 28 when the third member 33 of the second motion conversion mechanism 8 rotates relative to the fourth member 35.

(2) Normal Operation Using Second Electric Motor

Figure 5:
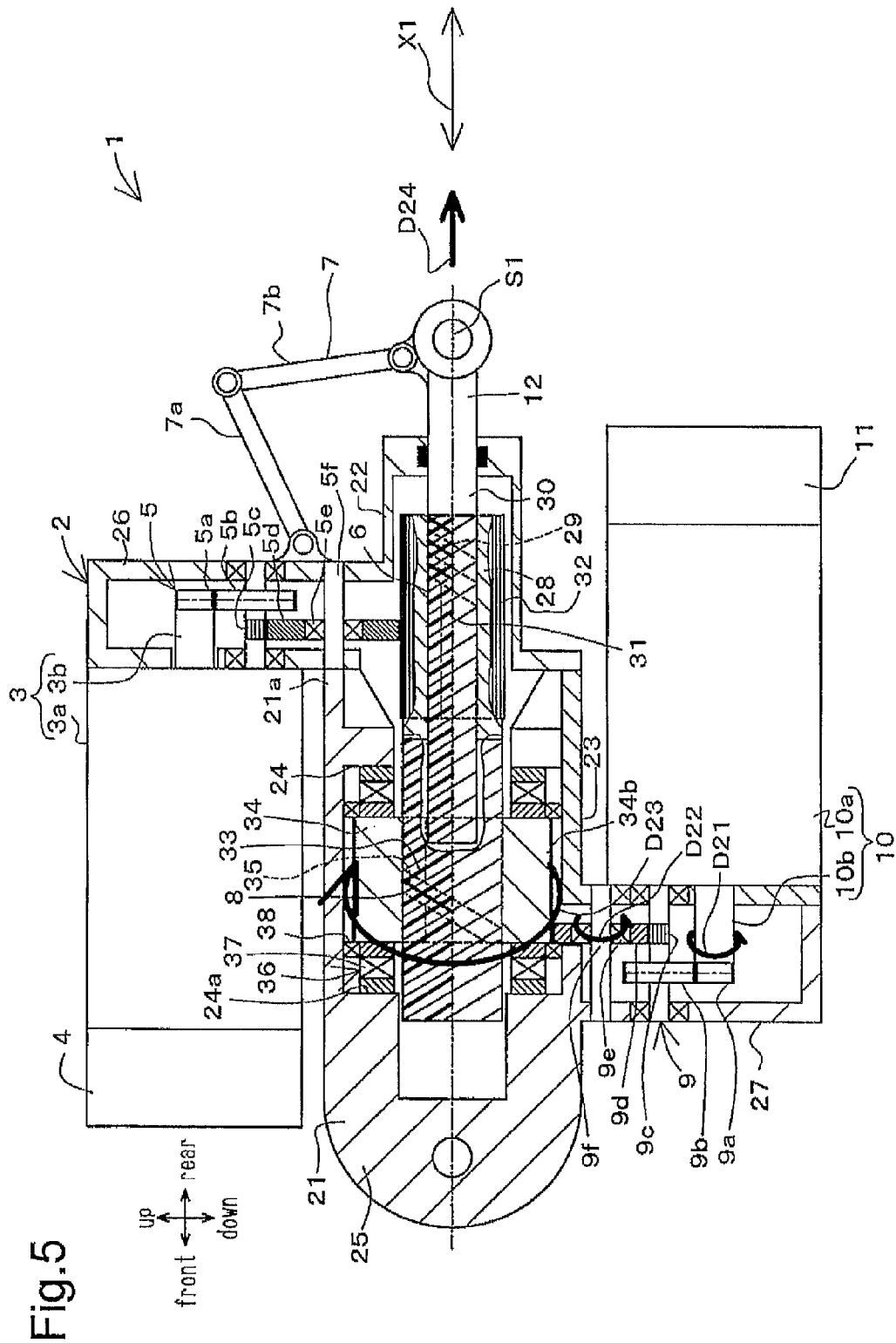
FIG. 5 is a diagram illustrating the normal operation of the electromechanical actuator when a second electric motor is driven.

FIG. 5 is a diagram illustrating the normal operation of the electromechanical actuator 1 when the second electric motor 10 is driven. Referring to FIG. 5, in the normal operation using the second electric motor 10, the second motion conversion mechanism 8 operates in a state that the rotation of the first shaft 28 is restricted while the first shaft 28 is allowed to move in the axial direction X1. This moves the output portion 12 in the axial direction X1.

More specifically, the controller locks the output shaft 3*b* of the first electric motor 3 using the first brake mechanism 4. Thus, the output shaft 3*b* of the first electric motor 3 cannot rotate. This locks the first force transmission mechanism 5, which is coupled to the first electric motor 3. That is, the rotation of the first shaft 28 is restricted. However, since the spur teeth portion 32 of the first shaft 28 includes spur teeth extending in the axial direction X1, the first shaft 28 is allowed to move relative to the gear 5*d* in the axial direction X1.

Under this situation, when the second electric motor 10 operates, the rotation (e.g., indicated by the arrow D21 in FIG. 5) of the output shaft 10b of the second electric motor 10 is transmitted to the third shaft 34 through the second force transmission mechanism 9. One example of a direction in which the second force transmission mechanism 9 rotates is indicated by the arrow D22 in FIG. 5. This rotates the third shaft 34 around the center axis S1, for example, as shown by the arrow D23 in FIG. 5. When the third shaft 34 rotates, the rotary movement of the fourth member 35 is converted to the linear movement of the third member 33. This moves the first shaft 28, which is formed integrally with the third member 33, together with the second shaft 30 (output portion 12) in the axial direction X1 (direction indicated by the arrow D24 in FIG. 5).

(3) Speed Summing Operation

Figure 6:
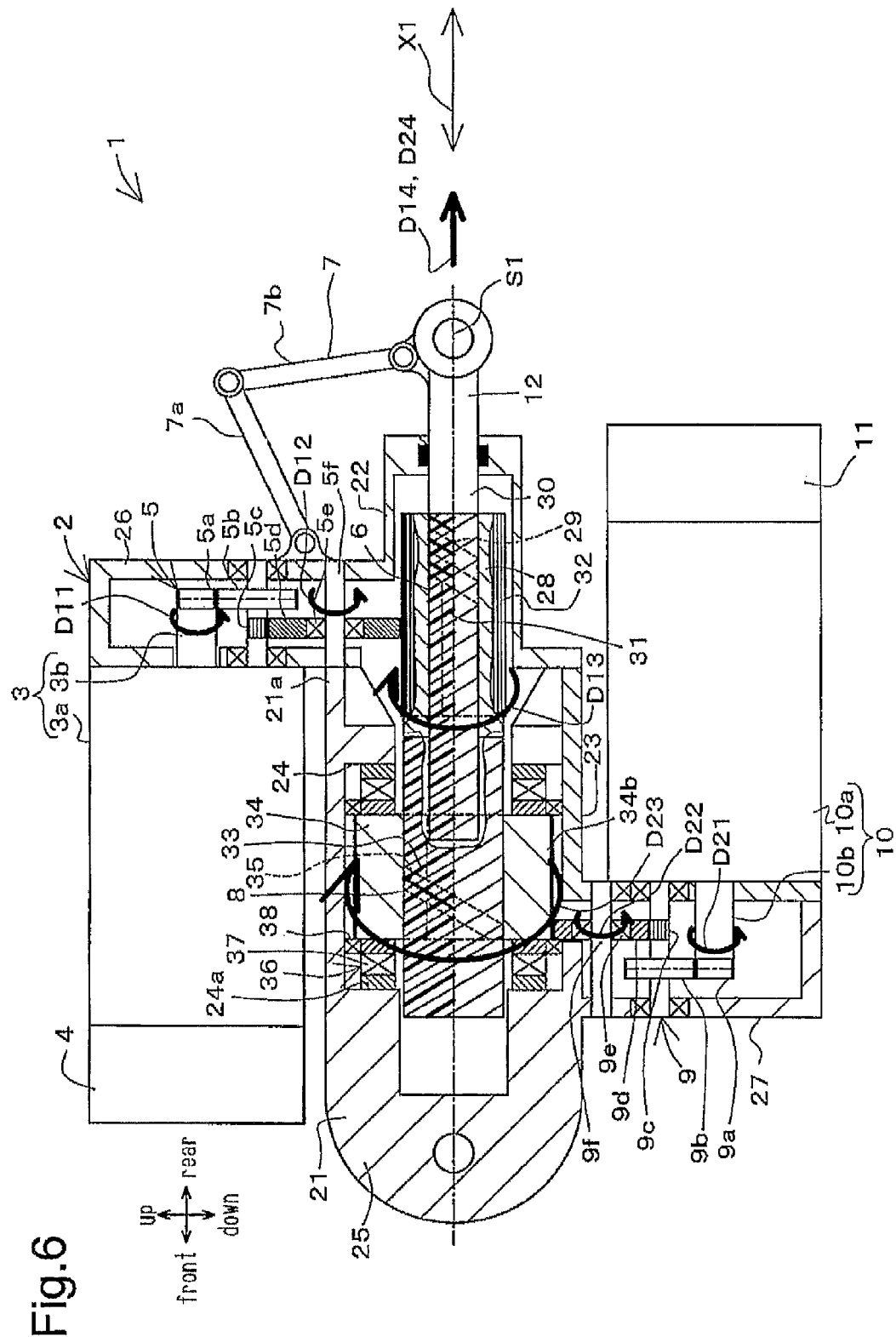
FIG. 6 is a diagram illustrating the normal operation of the electromechanical actuator during a speed summing operation.

As shown in FIG. 6, during the summing operation performed by the first electric motor 3 and the second electric motor 10, the first motion conversion mechanism 6 and the second motion conversion mechanism 8 are driven to move the output portion 12 in the axial direction X1 (direction indicated by the arrow D14, D24 in FIG. 6).

In this case, the operation of the output portion 12 is a combination of (1) the operation of the output portion 12 when the first electric motor 3 is driven and (2) the operation of the output portion 12 when the second electric motor 10 is driven, which have been described above. The arrows D11, D12, D13, D21, D22, D23 shown in FIG. 6 indicate examples of directions in which the components of the electromechanical actuator 1 rotate during this operation.

(4) Operation when First Motion Conversion Mechanism is Jammed

Figure 7:
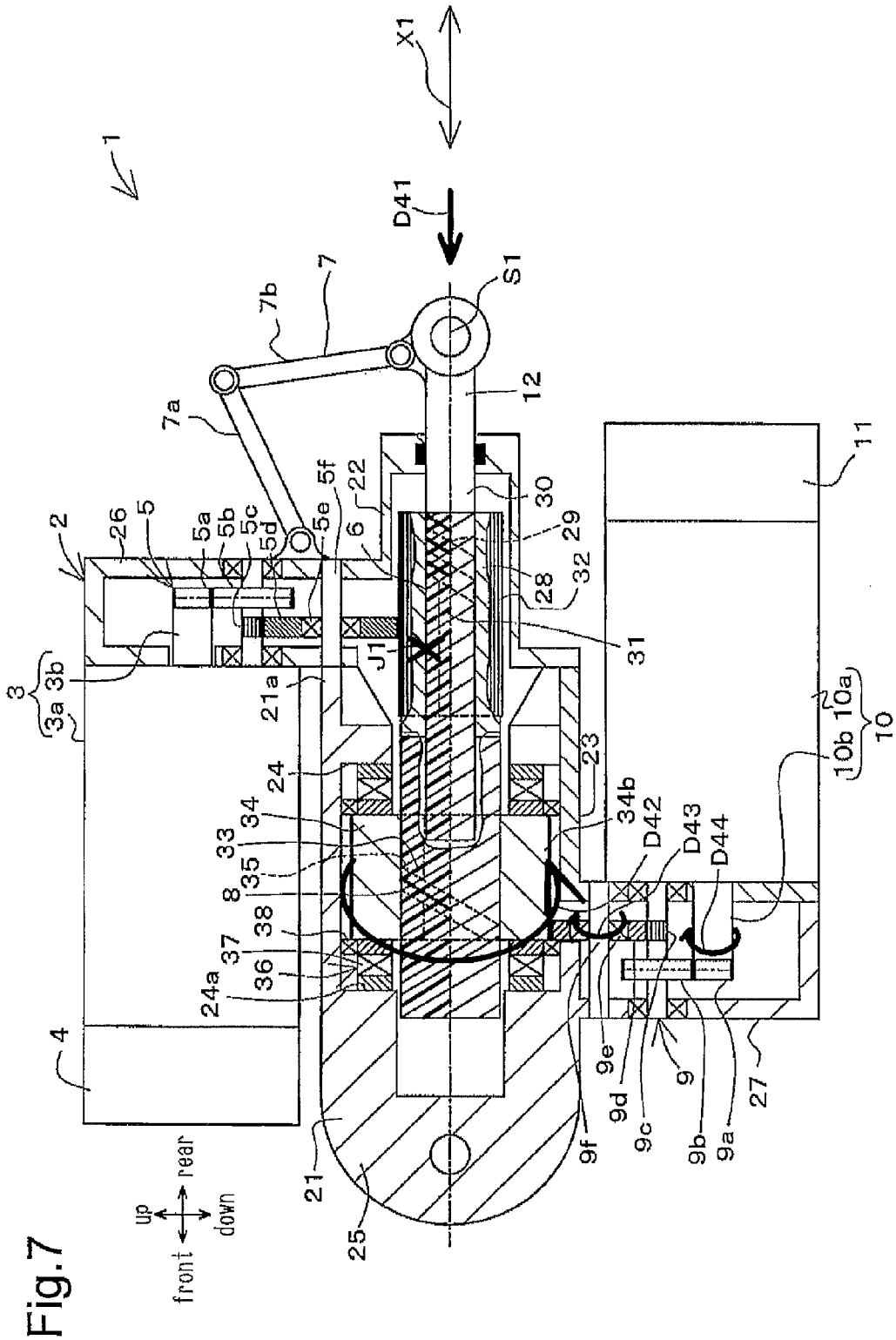
FIG. 7 is a diagram illustrating the operation of the electromechanical actuator when a first motion conversion mechanism is jammed.

FIG. 7 is a diagram illustrating the operation of the electromechanical actuator 1 when the first motion conversion mechanism 6 is jammed. Referring to FIG. 7, when the first motion conversion mechanism 6 is jammed, the second brake mechanism 11 unlocks the third shaft 34. This allows force applied from the outside of the electromechanical actuator 1 to move the output portion 12 in the axial direction X1.

More specifically, jamming may occur in the first motion conversion mechanism 6, for example, when a foreign material is caught between the first member 29 and the second member 31 (jammed location is indicated by the symbol J1 in FIG. 7). This disables the relative movement of the first and second members 29, 31. As a result, the axial movement of the output portion 12 is disabled. In this case, the controller cancels the braking action of the second brake mechanism 11. This cancels the rotation restrictions of the output shaft 10b of the second electric motor 10, the gears 9a to 9d of the second force transmission mechanism 9, and the third shaft 34 (fourth member 35).

Under this situation, when the output portion 12 moves in the axial direction X1 by receiving the force from the flight control surface 102, the second shaft 30 moves integrally with the first shaft 28 in the axial direction X1. In this case, the fourth member 35 of the third shaft 34 may rotate around the center axis S1. Thus, when the third member 33 of the first shaft 28 moves in the axial direction X1, the fourth member 35 of the third shaft 34 rotates around the center axis S1 and allows the axial movement of the output portion 12. This allows the output portion 12 to move in the axial direction X1 (e.g., direction indicated by the arrow D41 in FIG. 7) even during jamming. At this time, the controller may restrict the rotation of the output shaft 3b using the first brake mechanism 4. In this case, the rotations of the output shaft 3b, the gears 5a to 5d, and the first shaft 28 are restricted. This moves the first shaft 28 in the axial direction X1 in a further assured manner. Alternatively, one of the first electric motor 3 and the second electric motor 10 may be driven to move the output portion 12 in the axial direction X1. Examples of directions in which the third shaft 34, the gears 9a to 9d of the second force transmission mechanism 9, and the output shaft 10b of the second electric motor 10 are indicated by the arrows D42, D43, D44 in FIG. 7.

(5) Operation when Second Motion Conversion Mechanism is Jammed

Figure 8:
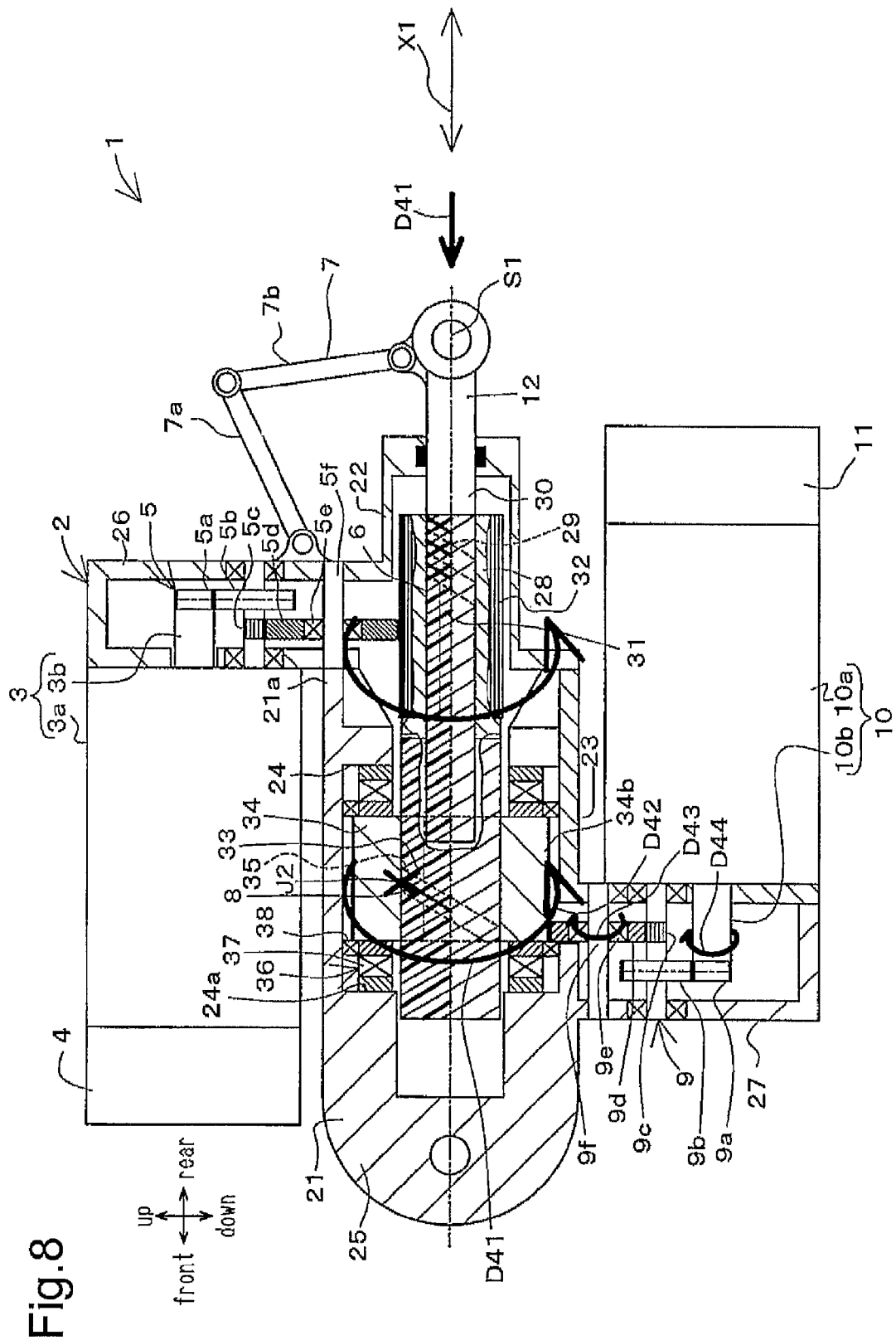
FIG. 8 is a diagram illustrating the operation of the electromechanical actuator when a second motion conversion mechanism is jammed.

FIG. 8 is a diagram illustrating the operation of the electromechanical actuator 1 when the second motion conversion mechanism 8 is jammed. Referring to FIG. 8, when the second motion conversion mechanism 8 is jammed, the second brake mechanism 11 unlocks the third shaft 34. This allows force applied from the outside of the electromechanical actuator 1 to move the output portion 12 in the axial direction X1.

More specifically, jamming may occur in the second motion conversion mechanism 8, for example, when a foreign material is caught between the third member 33 and the fourth member 35 (jammed location is indicated by the symbol J2 in FIG. 8). This disables the relative movement of the third and fourth members 33, 35. As a result, the axial movement of the output portion 12 is disabled. In this case, the controller cancels the braking action of the second brake mechanism 11. This cancels the rotation restrictions of the output shaft 3b of the first electric motor 3, the gears 5a to 5d of the first force transmission mechanism 5, and the third shaft 34 (fourth member 35).

Consequently, when receiving the force from the flight control surface 102, the output portion 12 may be moved in the axial direction X1. The movement of the output portion 12 in the axial direction X1 rotates the first shaft 28 relative to the second shaft 30. At this time, the third member 33 and the fourth member 35 of the third shaft 34 integrally rotate around the center axis S1. This allows the output portion 12 to move in the axial direction X1 (e.g., direction indicated by the arrow D41 in FIG. 8) even during jamming. Examples of directions in which the third shaft 34, the gears 9a to 9d of the second force transmission mechanism 9, and the output shaft 10b of the second electric motor 10 are indicated by the arrows D42, D43, D44 in FIG. 8.

As described above, in the electromechanical actuator 1 of the present embodiment, during the normal operation, in which the first motion conversion mechanism 6 is not jammed, the controller restricts the rotation of the fourth member 35 using the second brake mechanism 11. Under this situation, when the first electric motor 3 is driven, the output of the first electric motor 3 is transmitted to the second member 31 from the first member 29. This results in the linear movement of the second member 31 (output portion 12). When the jamming of the first motion conversion mechanism 6 locks the first member 29 and the second member 31, the second brake mechanism 11 operates to allow the fourth member 35 to rotate when the third member 33 moves. More specifically, the controller cancels the braking action of the second brake mechanism 11. This allows the rotation of the fourth member 35 when the third member 33 moves axially. In this case, when the second member 31 linearly moves by receiving an external force, the first member 29 also moves linearly. That is, the third member 33 also moves linearly. In this case, the fourth member 35 rotates when the third member 33 moves linearly. Thus, the fourth member 35 allows the linear movement of the third member 33. That is, the electromechanical actuator 1 can move the output portion 12 (i.e., operating portion, such as a rod), which is coupled to the second member 31, in a further assured manner even when jamming occurs. Additionally, the second brake mechanism 11 only needs to accomplish an easy operation, that is, determination whether or not to allow the rotation of the fourth member 35. This simplifies the structure of the second brake mechanism 11. Further, there is no need to arrange heavy apparatus, such as a number of electromagnetic clutches. This further reduces the weight of the electromechanical actuator 1.

Therefore, the electromechanical actuator 1 has a simple structure and allows the movement of the output portion 12 in a further assured manner even when jamming occurs.

The electromechanical actuator 1 includes the first to fourth members 29, 31, 33, 35, each of which is a screw or a nut. This structure allows each of the motion conversion mechanisms 6, 8 to be formed using an inexpensive configuration.

The electromechanical actuator 1 includes the spur teeth portion 32 that forms splines extending in the axial direction X1 on the outer circumference of the first shaft 28. In this structure, when the first motion conversion mechanism 6 is jammed, the first shaft 28 (first member 29 and third member 33) can move in the axial direction X1 while the spur teeth portion 32 is kept meshed with the gear 5d, which receives the output from the first electric motor 3.

The electromechanical actuator 1 includes the rotation stop mechanism 7 that restricts the rotation of the second member 31. This structure ensures the axial movement of the second member 31 when the first member 29 rotates. That is, the second member 31 can be hindered from rotating along the first member 29.

In the electromechanical actuator 1, the first shaft 28 includes the first member 29 and the third member 33, which are arranged in a straight line. Thus, the electromechanical actuator 1 may be elongated in the axial direction X1. This limits an enlargement of the electromechanical actuator 1 in the radial direction of the first shaft 28. Such a shape is particularly favorable for the electromechanical actuator 1 used for an aircraft, in which there is a large demand for miniaturization in a radial direction.

In the electromechanical actuator 1, the first shaft 28, the second shaft 30, and the third shaft 34 are coaxial with each other. This limits the enlargement of the electromechanical actuator 1 in the radial direction of the first shaft 28 in a further assured manner.

In the electromechanical actuator 1, when the rotation of the fourth member 35 is restricted in accordance with the axial movement of the third member 33, the fourth member 35 receives a relatively large axial force from the third member 33. Such an axial force can be assuredly received by the thrust bearings 37, which support the fourth member 35.

In the electromechanical actuator 1, when the rotation of the fourth member 35 is allowed, the second electric motor 10 can be driven to rotate the fourth member 35. In this situation, the meshing of the fourth member 35 with the third member 33 allows the axial movement of the third member 33. When the third member 33 moves, the first member 29 and the second member 31 move in the axial direction X1. More specifically, the amount in the axial movement of the second member 31 is the total amount of the axial movement of the second member 31 driven by the first electric motor 3 and the axial movement of the second member 31 driven by the second electric motor 10. Such a speed summing operation further increases the amount in the axial movement of the second member 31. This further quickly moves the output portion 12, which is coupled to the second member 31. That is, the electromechanical actuator 1 can increase a response speed.

In the electromechanical actuator 1, even when the rotation of the first member 29 is restricted, the second electric motor 10 can be driven to move the second member 31 in the axial direction X1. More specifically, when the second electric motor 10 is driven to rotate the fourth member 35, the first brake mechanism 4 limits the rotation of the third member 33 along the fourth member 35. This further ensures the axial movement of the third member 33 resulting from the relative rotation of the fourth member 35 and the third member 33, that is, the axial movement of the first member 29 and the second member 31.

In the electromechanical actuator 1, the second brake mechanism 11 only needs to restrict the rotation of the fourth member 35. This further simplifies the structure of the second brake mechanism 11.

Second Embodiment

Figure 9:
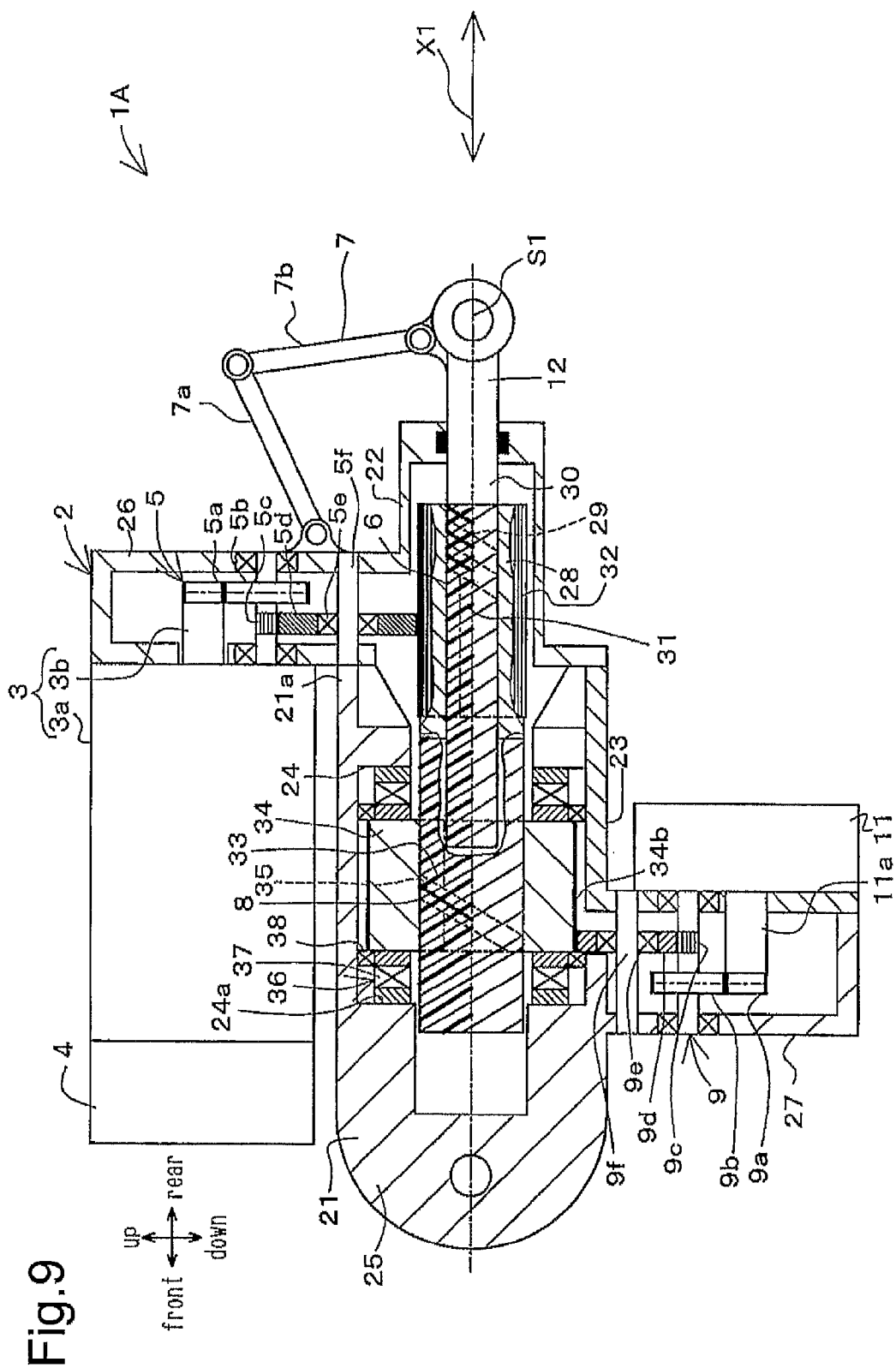
FIG. 9 is a partially cross-sectional schematic side view of an electromechanical actuator according to a second embodiment of the present invention.

FIG. 9 is a partially cross-sectional schematic side view of an electromechanical actuator 1A according to a second embodiment of the present invention. Here, the description will focus on the differences from the components of the first embodiment. In FIG. 9, the same reference symbols are given to those components that are the same as the corresponding components of the first embodiment. Such components will not be described in detail.

Referring to FIG. 9, the electromechanical actuator 1A corresponds to the electromechanical actuator 1 excluding the second electric motor 10. The second brake mechanism 11 includes a braking shaft 11a that is coupled to the gear 9a and capable of rotating integrally with the gear 9a. In this structure, the electromechanical actuator 1A can perform the same operations as (1) a normal operation using the first electric motor 3, (4) an operation when the first motion conversion mechanism 6 is jammed, and (5) an operation when the second motion conversion mechanism 8 is jammed, which have been described.

To ensure the redundancy, a plurality of electromechanical actuators 1A may be arranged in one flight control surface 102. In this case, when one of the electromechanical actuators 1A is jammed, the controller cancels the braking operation of the second brake mechanism 11 of the electromechanical actuator 1A. This allows another electromechanical actuator 1A to drive the flight control surface 102.

Third Embodiment

Figure 10:
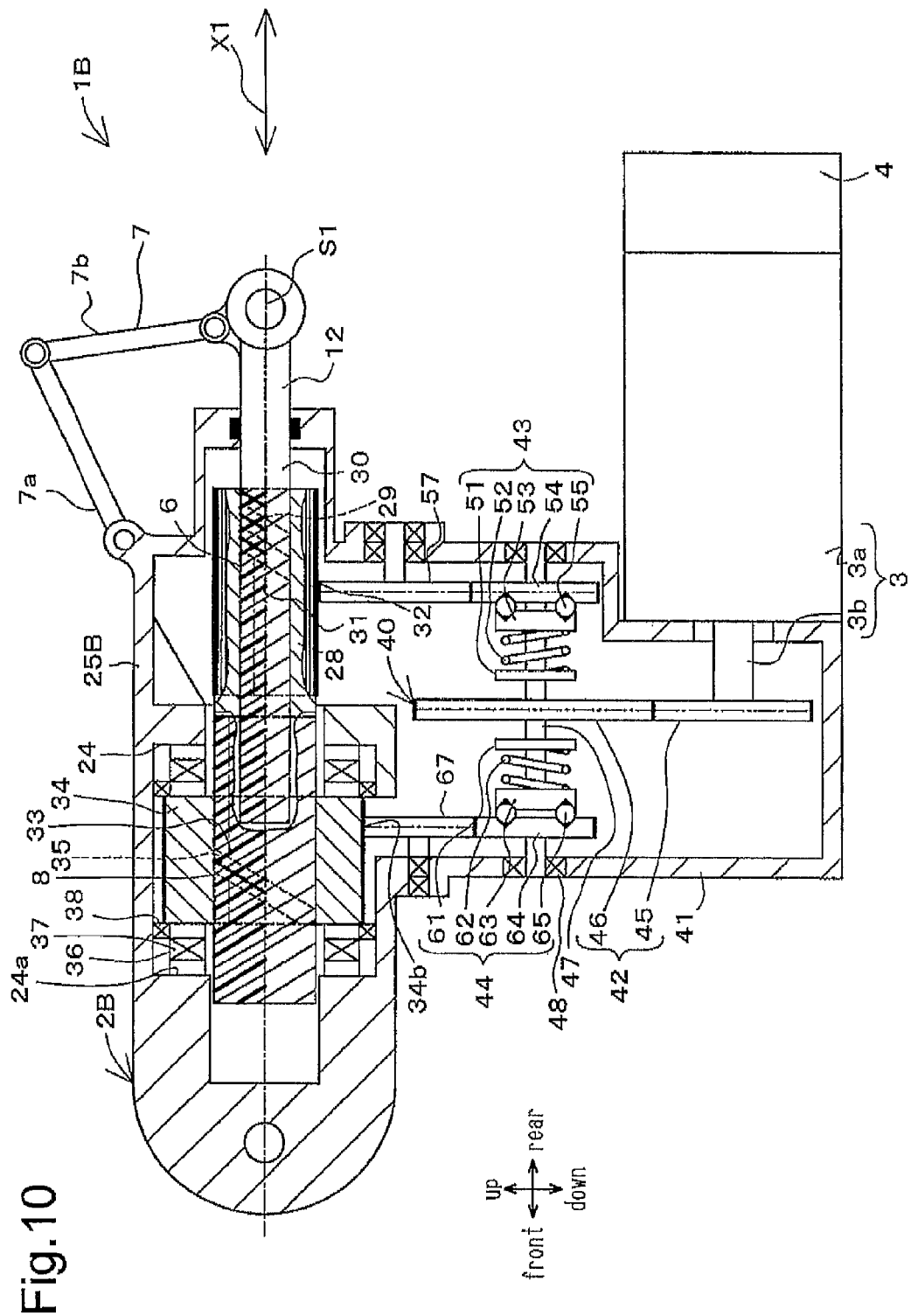
FIG. 10 is a partially cross-sectional schematic side view of an electromechanical actuator according to a third embodiment of the present invention.

FIG. 10 is a partially cross-sectional schematic side view of an electromechanical actuator 1B according to a third embodiment of the present invention. Referring to FIG. 10, the electromechanical actuator 1B differs from the electromechanical actuator 1 of the first embodiment in the following aspects. In one aspect, a housing 2B is used instead of the housing 2. In another aspect, a force division mechanism 40 is arranged.

The electromechanical actuator 1B includes the housing 2B, the first electric motor 3, the first brake mechanism 4, the force division mechanism 40, the first motion conversion mechanism 6, the rotation stop mechanism 7, and the second motion conversion mechanism 8.

The housing 2B is formed by a single member. The housing 2B includes a housing body 25B and a force division mechanism receptacle 41.

The housing body 25B is a tubular component and accommodates the first motion conversion mechanism 6 and the second motion conversion mechanism 8. The force division mechanism receptacle 41 projects from an intermediate portion of the housing body 25B.

The force division mechanism receptacle 41 is a hollow portion extending from the housing body 25B in the direction orthogonal to the center axis S1 (radial direction). The force division mechanism receptacle 41 accommodates the force division mechanism 40 and a distal portion of the output shaft 3b of the first electric motor 3.

The motor housing 3a of the first electric motor 3 is fixed to the force division mechanism receptacle 41 and located outside the force division mechanism receptacle 41. The first electric motor 3 is coupled to the first motion conversion mechanism 6 and the second motion conversion mechanism 8 via the force division mechanism 40.

The force division mechanism 40 divides the output of the first electric motor 3 and transmits the divided outputs to the first motion conversion mechanism 6 and the second motion conversion mechanism 8. The force division mechanism 40 is configured to allow the axial movement of the output portion 12 even when jamming occurs.

The force division mechanism 40 includes a gear unit 42, a first torque limiter 43, and a second torque limiter 44.

The gear unit 42 transmits the output of the first electric motor 3 to each of the torque limiters 43, 44. The gear unit 42 is, for example, a parallel-axis gear mechanism, and includes two gears 45, 46.

The gear 45 is fixed to the output shaft 3b and meshed with the gear 46. The gear 46 is fixed to a support shaft 47. The support shaft 47 is rotatably supported by a bearing 48 in the force division mechanism receptacle 41 of the housing 2B. The support shaft 47 supports the torque limiters 43, 44.

When torque acting between the first electric motor 3 and the first motion conversion mechanism 6 is greater than or equal to a predetermined value, the first torque limiter 43 rotates freely. The first torque limiter 43 is located between the first electric motor 3 and the first member 29 of the first motion conversion mechanism 6. The first torque limiter 43 is an example of a "first motion conversion mechanism torque limiter that restricts rotation of the first screw" of the present invention.

The first torque limiter 43 includes a spring seat 51, a spring 52, two first opposing members 53, 54, and balls 55.

The spring seat 51 is a plate-like component fixed to the support shaft 47 and located at the rear side of the gear 46. The spring seat 51 receives the spring 52. The spring 52 is, for example, a coil spring, and surrounds the support shaft 47. The spring 52 generates an urging force that urges the first opposing members 53, 54 toward each other.

The first opposing members 53, 54 are configured to be coupled so that force can be transmitted to each other when the torque acting between the first electric motor 3 and the first member 29 is less than the predetermined value. The first opposing members 53, 54 are configured to rotate freely relative to each other when the torque acting between the first electric motor 3 and the first member 29 is greater than or equal to the predetermined value.

The first opposing members 53, 54 each are discoid and supported by the support shaft 47. The first opposing member 53 is in contact with the spring 52 and spline-coupled to the support shaft 47. The first opposing member 53 is movable in the axial direction X1 and capable of rotating integrally with the support shaft 47. Thus, the first opposing member 53 is capable of transmitting force to the output shaft 3b of the first electric motor 3. The first opposing member 54 is supported by the support shaft 47 and rotatable relative to the support shaft 47. The rearward movement of the first opposing member 54 is restricted by a stopper (not shown). The first opposing member 54 is coupled to the first member 29 via an intermediate gear 57 so that force can be transmitted to the first member 29. The first opposing members 53, 54 each include grooves in a surface opposing the other member. The grooves are arranged in the circumferential direction of the support shaft 47. The balls 55 are located in the grooves.

In the above structure, when torque acting between the two first opposing members 53, 54 reaches or exceeds the predetermined value, the first opposing member 53 moves toward the gear 46 against the urging force of the spring 52. Thus, the distance increases between the first opposing members 53, 54. Then, the balls 55 roll between the first opposing members 53, 54. This rotates the first opposing members 53, 54 relative to each other. The first opposing member 54 includes teeth on the outer circumference. The teeth of the first opposing member 54 mesh with the intermediate gear 57. The intermediate gear 57 is arranged parallel to the spur teeth portion 32 of the first shaft 28 and meshes with the spur teeth portion 32. The intermediate gear 57 is rotatably supported in the force division mechanism receptacle 41 of the housing 2B by a support shaft and a bearing.

The first torque limiter 43 and the second torque limiter 44 are in a front-rear symmetric arrangement.

When torque acting between the first electric motor 3 and the second motion conversion mechanism 8 is greater than or equal to the predetermined value, the second torque limiter 44 rotates freely. The second torque limiter 44 is located between the first electric motor 3 and the fourth member 35. The second torque limiter 44 is an example of the "rotation restriction mechanism for second motion conversion mechanism" and an example of a "second motion conversion mechanism torque limiter" of the present invention.

The second torque limiter 44 includes a spring seat 61, a spring 62, two second opposing members 63, 64, and balls 65.

The spring seat 61 is a plate-like component fixed to the support shaft 47 and located at the front side of the gear 46. The spring seat 61 receives the spring 62. The spring 62 is, for example, a coil spring, and surrounds the support shaft 47. The spring 62 generates an urging force that urges the second opposing members 63, 64 toward each other.

The second opposing members 63, 64 are configured to be coupled so that force can be transmitted to each other when the torque acting between the first electric motor 3 and the fourth member 35 is less than the predetermined value. The second opposing members 63, 64 are configured to rotate freely relative to each other when the torque acting between the first electric motor 3 and the fourth member 35 is greater than or equal to the predetermined value.

The second opposing members 63, 64 each are discoid and supported by the support shaft 47. The second opposing member 63 is in contact with the spring 62 and spline-coupled to the support shaft 47. The second opposing member 63 is movable in the axial direction X1 and capable of rotating integrally with the support shaft 47. Thus, the second opposing member 63 is capable of transmitting force to the output shaft 3b of the first electric motor 3. The second opposing member 64 is supported by the support shaft 47 and rotatable relative to the support shaft 47. The forward movement of the second opposing member 64 is restricted by a stopper (not shown). The second opposing member 64 is coupled to the fourth member 35 via an intermediate gear 67 so that force can be transmitted to the fourth member 35. The second opposing members 63, 64 each include grooves in a surface opposing the other member. The grooves are arranged in the circumferential direction of the support shaft 47. The balls 65 are located in the grooves.

In the above structure, when torque acting between the two second opposing members 63, 64 reaches or exceeds the predetermined value, the second opposing member 63 moves toward the gear 46 against the urging force of the spring 62. Thus, the distance increases between the second opposing members 63, 64. Then, the balls 65 roll between the second opposing members 63, 64. This rotates the second opposing members 63, 64 relative to each other. The second opposing member 64 includes teeth on the outer circumference. The teeth of the second opposing member 64 mesh with the intermediate gear 67. The intermediate gear 67 is arranged parallel to the teeth 34b of the third shaft 34 and meshes with the teeth 34b. The intermediate gear 67 is rotatably supported in the force division mechanism receptacle 41 of the housing 2B by a support shaft and a bearing.

The schematic structure of the electromechanical actuator 1B has been described. The operation of the electromechanical actuator 1B will now be described. The electromechanical actuator 1B can perform (a) a speed summing operation (normal operation), (b) an operation when the first motion conversion mechanism 6 is jammed (when the first electric motor is driven), and (c) an operation when the second motion conversion mechanism 8 is jammed (when the first electric motor is driven).

(a) Speed Summing Operation

Figure 11:
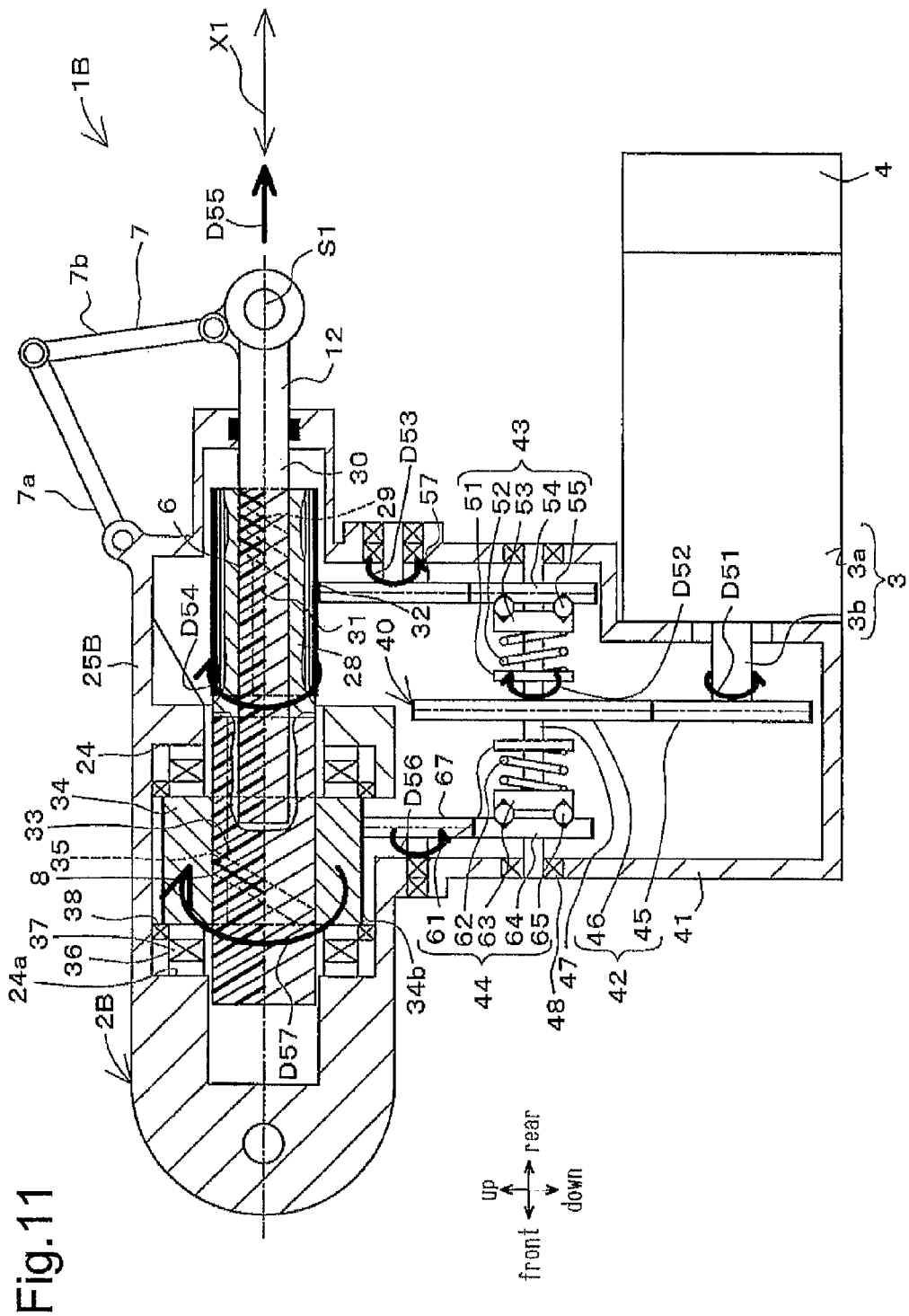
FIG. 11 is a diagram illustrating a speed summing operation of the third embodiment.

FIG. 11 is a diagram illustrating the speed summing operation of the third embodiment. Referring to FIG. 11, in the speed summing operation performed by the first electric motor 3 (normal operation), the first motion conversion mechanism 6 and the second motion conversion mechanism 8 operates. This moves the output portion 12 in the axial direction X1 (direction indicated by the arrow D55 in FIG. 11).

More specifically, when the first electric motor 3 is driven, the rotation (e.g., indicated by the arrow D51 in FIG. 11) of the output shaft 3b of the first electric motor 3 is transmitted to the force division mechanism 40. In the force division mechanism 40, the gear 46 rotates, for example, in a direction indicated by the arrow D52 in FIG. 11. This rotates the support shaft 47 and the torque limiters 43, 44 in the same direction as the gear 46 (e.g., direction indicated by the arrow D52 in FIG. 11). The rotations of the torque limiters 43, 44 are transmitted to the respective first shaft 28 and the third shaft 34 through the respective intermediate gears 57, 67. The rotational direction of the intermediate gear 57 and the rotational direction of the intermediate gear 67 are, for example, respectively indicated by the arrow D53 and the arrow D56 in FIG. 11. Consequently, the first shaft 28 rotates around the center axis S1 in the direction indicated by the arrow D54 in FIG. 11. In accordance with this rotation of the first shaft 28, the rotation of the first member 29 is converted to the linear motion of the second member 31. This moves the output portion 12, which is arranged integrally with the second member 31, in the axial direction X1.

The rotation of the intermediate gear 57 rotates the third shaft 34 around the center axis X1 as indicated by the arrow D57 in FIG. 11. In accordance with this rotation of the third shaft 34, the rotation of the fourth member 35 is converted to the linear motion of the third member 33. This moves the first shaft 28, which is arranged integrally with the third member 33, together with the output portion 12 in the axial direction X1.

(b) Operation when First Motion Conversion Mechanism is Jammed (when First Electric Motor is Driven)

Figure 12:
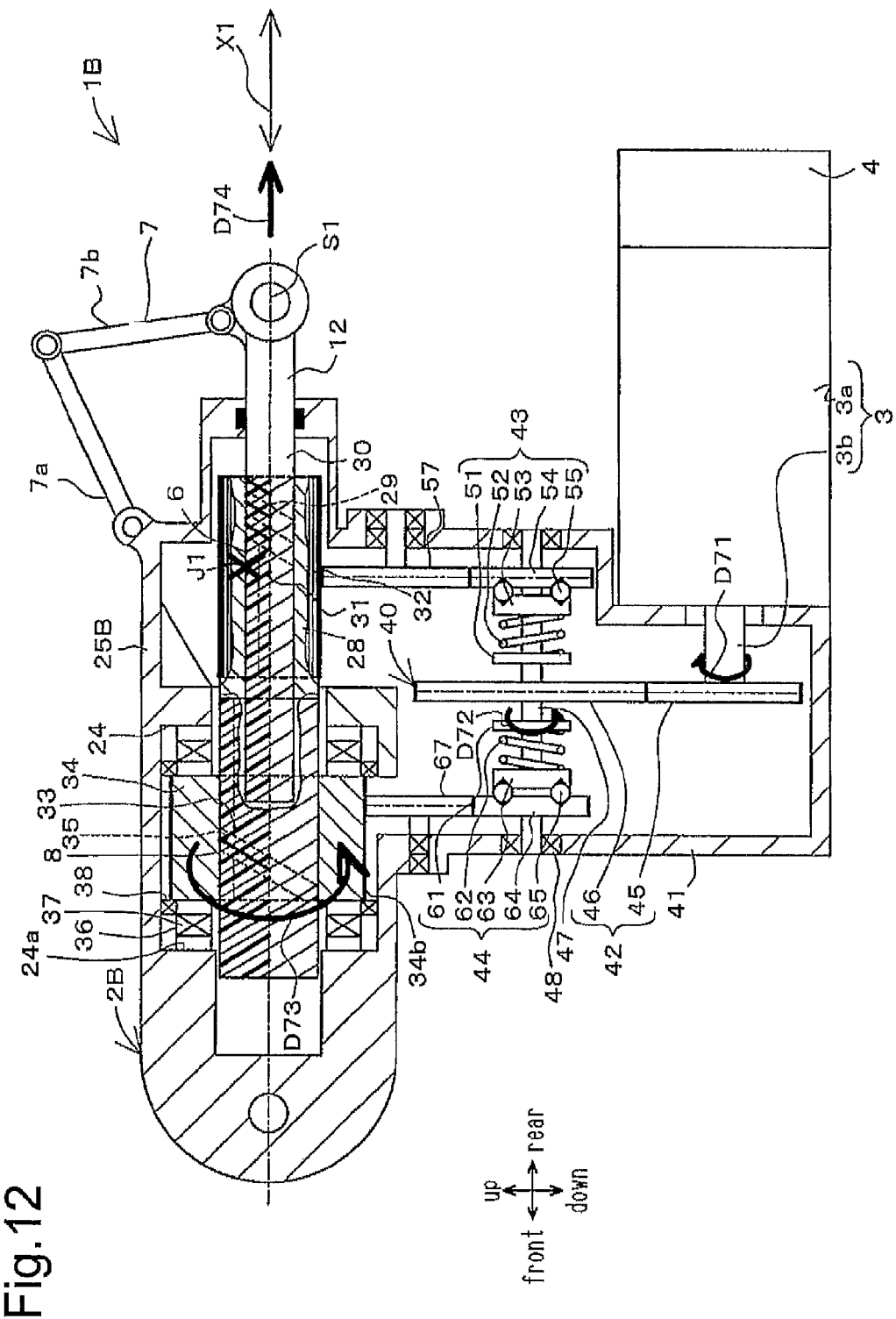
FIG. 12 is a diagram illustrating the operation of the electromechanical actuator of the third embodiment when the first motion conversion mechanism is jammed (when the first electric motor is driven)

FIG. 12 is a diagram illustrating the operation when the first motion conversion mechanism 6 is jammed (when the first electric motor is driven). Referring to FIG. 12, even when the first motion conversion mechanism 6 is jammed, the output portion 12 can be moved in the axial direction X1 when the first electric motor 3 is driven.

More specifically, jamming may occur in the first motion conversion mechanism 6, for example, when a foreign material is caught between the first member 29 and the second member 31. The symbol J1 in FIG. 12 indicates an example of a jammed location between the first and second members 29, 31. This prevents the axial movement of the output portion 12 that is performed when the first and second members 29, 31 move relative to each other. In this case, the rotation of the first shaft 28 is restricted. Thus, the intermediate gear 57 and the first opposing member 54 cannot rotate.

Under this situation, when the first electric motor 3 generates torque that is greater than or equal to a predetermined value, the output shaft 3b rotates, for example, in a direction of the arrow D71 in FIG. 12. This rotates the gear 46, the support shaft 47, and the two second opposing members 63, 64 in a direction indicated by the arrow D72 in FIG. 12. This rotation is transmitted to the third shaft 34 through the intermediate gear 67. The third shaft 34 (fourth member 35) rotates in a direction indicated by the arrow D73 in FIG. 12. Consequently, the third member 33 (i.e., first shaft 28) moves in the axial direction indicated by the arrow D74 in FIG. 12. Also, the output portion 12 moves in the direction indicated by the arrow D74.

In this case, the rotational torque of the support shaft 47 is greater than or equal to the predetermined value. Consequently, when the support shaft 47 rotates the first opposing member 53, force acting between the first opposing members 53, 54 exceeds the urging force of the spring 52. Thus, the first opposing member 53 compresses the spring 52. This increases the distance between the first opposing members 53, 54. Then, the balls 55 held between the first opposing members 53, 54 roll between the first opposing members 53, 54. The first opposing member 53 rotates freely relative to the first opposing member 54. This allows the rotation of the support shaft 47 (rotation of the output shaft 3b of the first electric motor 3). That is, the output portion 12 is movable in the axial direction X1 even when jamming occurs.

(c) Operation when Second Motion Conversion Mechanism is Jammed (when First Electric Motor is Driven)

Figure 13:
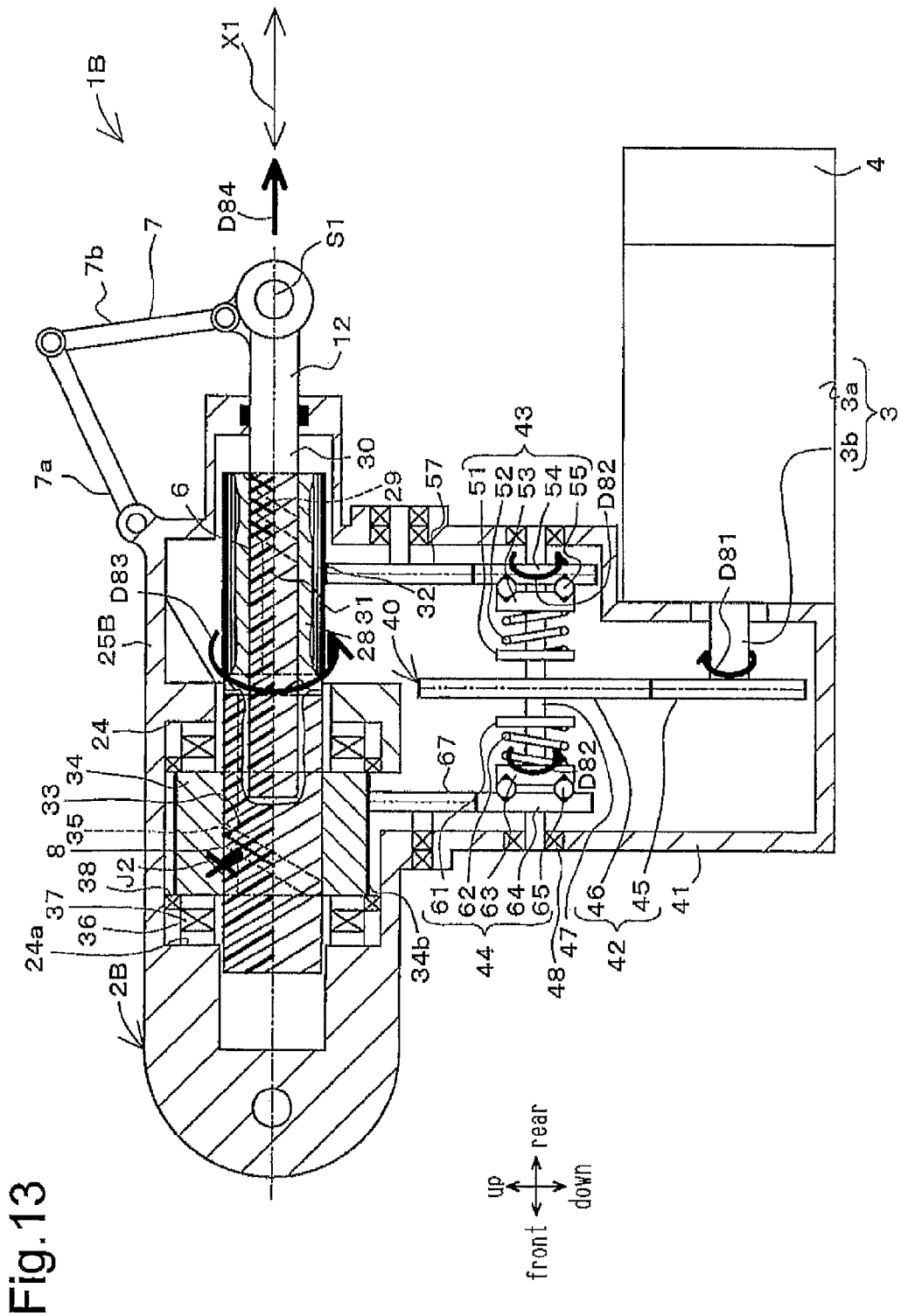
FIG. 13 is a diagram illustrating the operation of the electromechanical actuator of the third embodiment when the second motion conversion mechanism is jammed (when the first electric motor is driven)

FIG. 13 is a diagram illustrating the operation when the second motion conversion mechanism 8 is jammed (when the first electric motor is driven). Referring to FIG. 13, even when the second motion conversion mechanism 8 is jammed, the output portion 12 can be moved in the axial direction X1 when the first electric motor 3 is driven.

More specifically, jamming may occur in the second motion conversion mechanism 8, for example, when a foreign material is caught between the third member 33 and the fourth member 35. The symbol J2 in FIG. 13 indicates an example of a jammed location between the third and fourth members 33, 35. This disables the relative movement of the third and fourth members 33, 35. As a result, the axial movement of the output portion 12 is disabled.

Under this situation, when the first electric motor 3 generates torque that is greater than or equal to a predetermined value, the output shaft 3b rotates, for example, in a direction of the arrow D81 in FIG. 13. This rotates the gear 46 and the two first opposing members 53, 54 in a direction indicated by the arrow D82 in FIG. 13. This rotation is transmitted to the first shaft 28 through the intermediate gear 57. The first shaft 28 (first member 29) rotates in a direction indicated by the arrow D83 in FIG. 13. Consequently, the first member 29 (i.e., first shaft 28) moves in the axial direction indicated by the arrow D84. Also, the output portion 12 moves in the direction indicated by the arrow D84 in FIG. 13.

In this case, force that is transmitted from the third shaft 34 through the intermediate gear 67 and acts between the second opposing members 63, 64 exceeds the urging force of the spring 62. Thus, the second opposing member 63 compresses the spring 62. This increases the distance between the second opposing members 63, 64. Then, the balls 65 held between the second opposing members 63, 64 roll between the second opposing members 63, 64. The second opposing member 63 rotates freely relative to the second opposing member 64. This allows the rotation of the third shaft 34 (rotation of the first shaft 28). That is, the output portion 12 is movable in the axial direction X1 even when jamming occurs.

As described above, in the electromechanical actuator 1B, when the torque acting between the first electric motor 3 and the fourth member 35 is less than the predetermined value, the output of the first electric motor 3 is transmitted to the fourth member 35 through the second torque limiter 44. The rotation of the fourth member 35 moves the third member 33 in the axial direction X1. Consequently, the second member 31 (output portion 12) moves in the axial direction X1. This accomplishes the speed summing operation, which has been described. When the torque acting between the first electric motor 3 and the fourth member 35 is greater than or equal to the predetermined value, the fourth member 35 rotates freely relative to the output shaft 3b of the first electric motor 3. This allows the rotation of the fourth member 35 when the third member 33 moves axially. That is, when the first motion conversion mechanism 6 is jammed, the first member 29, the second member 31, and the third member 33 can move in the axial direction X1.

In the electromechanical actuator 1B, when the first member 29 of the first motion conversion mechanism 6 moves the second member 31 in the axial direction X1 using the output of the first electric motor 3, the first torque limiter 43 can transmit the output of the first electric motor 3 to the first member 29. However, when the first motion conversion mechanism 6 is jammed, the rotation of the first member 29 is restricted. Consequently, the torque acting between the first electric motor 3 and the first member 29 reaches or exceeds the predetermined value. In this case, the two first opposing members 53, 54 rotate freely relative to each other. This avoids the locking of the output shaft 3b of the first electric motor 3, which allows continuous rotation of the first electric motor 3. Consequently, the first electric motor 3 can rotate the fourth member 35 of the second motion conversion mechanism 8. That is, even when the first motion conversion mechanism 6 is jammed, the output portion 12 can be moved in the axial direction X1 using the first electric motor 3 and the second motion conversion mechanism 8.

Fourth Embodiment

Figure 14:
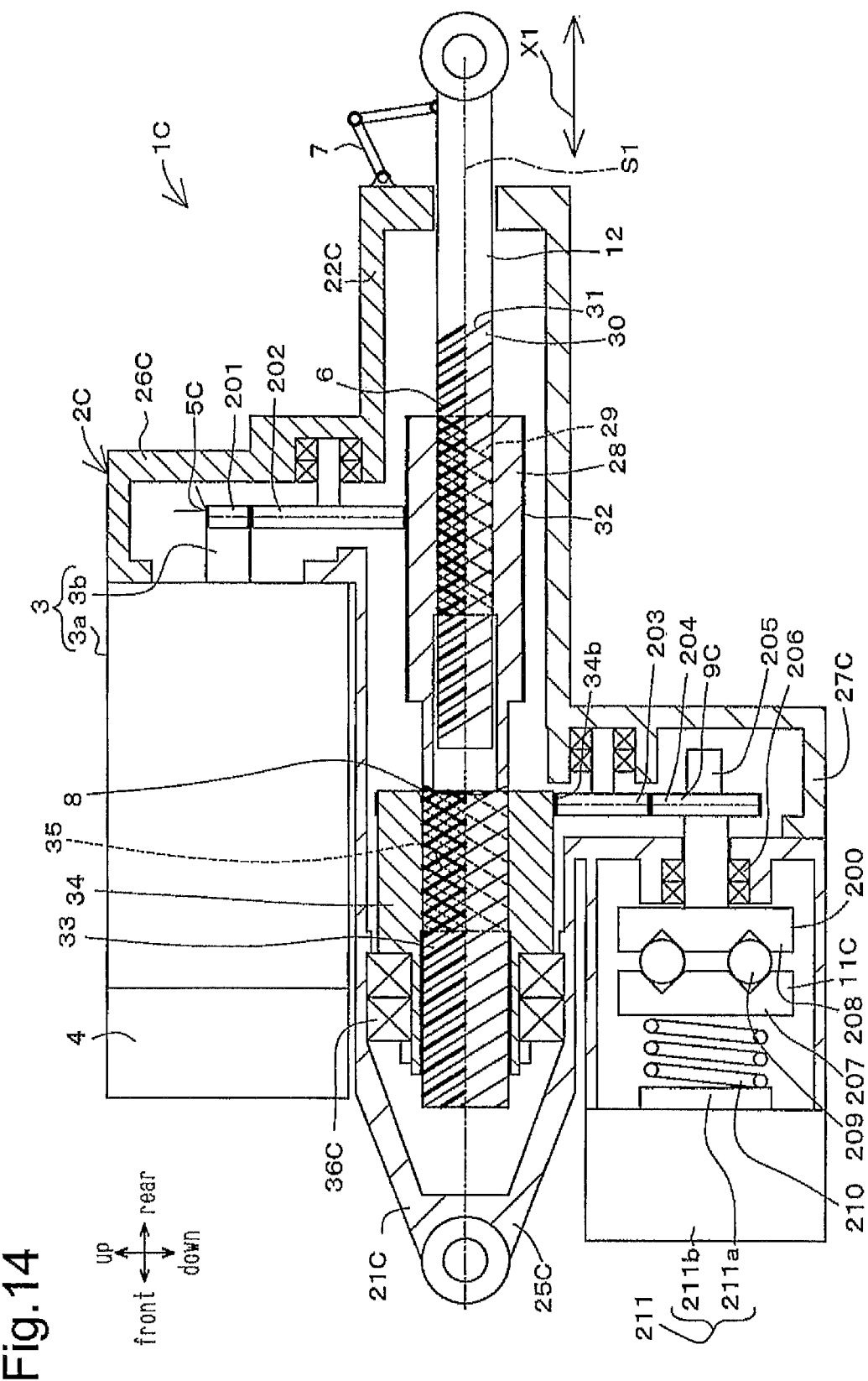
FIG. 14 is a partially cross-sectional schematic side view of an electromechanical actuator according to a fourth embodiment of the present invention.

FIG. 14 is a partially cross-sectional schematic side view of an electromechanical actuator 1C according to a fourth embodiment of the present invention. Referring to FIG. 14, instead of the second brake mechanism 11 of the electromechanical actuator 1A (refer to FIG. 9), the electromechanical actuator 1C includes a second brake mechanism 11C.

The electromechanical actuator 1C includes a housing 2C, the first electric motor 3, the first brake mechanism 4, a first force transmission mechanism 5C, the first motion conversion mechanism 6, the rotation stop mechanism 7, the second motion conversion mechanism 8, a second force transmission mechanism 9C, and the second brake mechanism 11C.

The housing 2C includes a first housing portion 21C and a second housing portion 22C.

The first housing portion 21C and the second housing portion 22C, which are arranged and coupled to each other in the front-rear direction, form the housing 2C. The housing 2C includes a housing body 25C, a first projection 26C, and a second projection 27C.

The housing body 25C is tubular and accommodates the first motion conversion mechanism 6 and the second motion conversion mechanism 8. The housing body 25C is annular the center of which is on the center axis S1. The first projection 26C projects from a rearward portion of the housing body 25C.

The first projection 26C is a hollow portion extending from the housing body 25C in the direction orthogonal to the center axis S1 (or in the radial direction). The first projection 26C accommodates the distal portion of the output shaft 3b of the first electric motor 3 and the first force transmission mechanism 5C. The second projection 27C is arranged at a location separated from that of the first projection 26C in the front-rear direction.

The second projection 27C is a hollow portion extending from the housing body 25C in a direction orthogonal to the center axis S1. The second projection 27C accommodates the second force transmission mechanism 9C and the second brake mechanism 11C. The first electric motor 3 is coupled to the first projection 26C. The first electric motor 3 is configured to be capable of transmitting force to the first motion conversion mechanism 6 through the first force transmission mechanism 5C.

The first force transmission mechanism 5C includes two gears 201, 202.

The gear 201 is fixed to the output shaft 3b of the first electric motor 3 and movable integrally with the output shaft 3b. The gear 201 meshes with the gear 202. The gear 202 is rotatably supported by the first projection 26C of the housing 2C. The gear 202 meshes with the spur teeth portion 32 of the first motion conversion mechanism 6. The gear 202 rotates when receiving the output of the first electric motor 3. The rotation of the gear 202 is transmitted to the spur teeth portion 32 of the first motion conversion mechanism 6.

In the present embodiment, the third shaft 34, in which the second motion conversion mechanism 8 of the fourth member 35 is formed, is supported in the housing body 25C of the housing 2C by a bearing unit 36C. The bearing unit 36C is formed using, for example, a ball bearing. The bearing unit 36C is configured to be capable of receiving a thrust load and a radial load acting on the third shaft 34.

This structure restricts movement of the third shaft 34 relative to the housing body 25C in the axial direction X1. The third shaft 34 is supported by the housing body 25C and rotatable about the center axis S1.

The second motion conversion mechanism 8 is coupled to the second brake mechanism 11C via the second force transmission mechanism 9C.

The second force transmission mechanism 9C includes two gears 203, 204.

The gear 203 meshes with the teeth 34b, which are formed on the outer circumference of the third shaft 34. The gear 203 is rotatably supported by the second projection 27C of the housing 2C. The gear 203 meshes with the gear 204. The gear 204 is rotatably supported in the second projection 27C by a support shaft 205 and a bearing 206.

The support shaft 205 is coupled to the gear 204 and capable of rotating integrally with the gear 204. The support shaft 205 is coupled to a torque limiter 200 of the second brake mechanism 11C.

The second brake mechanism 11C includes the torque limiter 200. The torque limiter 200 is configured to restrict rotation of the fourth member 35 when torque acting on the fourth member 35 is less than a predetermined value. That is, the torque limiter 200 rotates freely when torque acting on each of the motion conversion mechanisms 6, 8 is greater than or equal to the predetermined value. The torque limiter 200 is configured to be capable of changing the predetermined value.

The torque limiter 200 includes two opposing members 207, 208, which are opposed to each other, balls 209, a spring member 210, and a pressing force adjustment member 211.

The opposing members 207, 208 are configured to be coupled to transmit the force to each other when torque acting between the fourth member 35 and the pressing force adjustment member 211 is less than the predetermined value. Also, the opposing members 207, 208 are configured to rotate freely relative to each other when the torque acting between the fourth member 35 and the pressing force adjustment member 211 is greater than or equal to the predetermined value.

The opposing members 207, 208 each are discoid and supported by the support shaft 205. The opposing member 208 is fixed to the support shaft 205 and rotatable integrally with the support shaft 205. The opposing member 207 is fitted to the support shaft 205 and rotatable relative to the support shaft 205. The opposing member 207 is pressed by the spring member 210 toward the opposing member 208. The spring member 210 is, for example, a coil spring. The spring member 210 is located between the pressing force adjustment member 211 and the opposing member 208.

The pressing force adjustment member 211 is capable of adjusting force pressing the spring member 210 toward the opposing member 207. The pressing force adjustment member 211 is, for example, a solenoid the operation of which is controlled by the controller. The pressing force adjustment member 211 includes a casing 211b, which is fixed to the housing 2C. The pressing force adjustment member 211 includes a rod 211a, which receives the spring member 210 and urges the spring member 210 toward the opposing member 207. The opposing members 207, 208 each include grooves in a surface opposing the other member. The grooves are arranged in the circumferential direction of the support shaft 205. The balls 209 are located in the grooves.

This structure couples the opposing members 207, 208 to the fourth member 35 and the pressing force adjustment member 211. When torque acting between the opposing members 207, 208 reaches or exceeds the predetermine value, the opposing member 207 moves toward the spring member 210 against the urging force of the spring member 210. Thus, the distance increases between the opposing members 207, 208. Then, the balls 209 roll between the opposing members 207, 208. This rotates the opposing members 207, 208 relative to each other. The pressing force adjustment member 211 sets a torque value of the opposing member 207 when the opposing member 208 starts to rotate freely relative to the opposing member 207.

The pressing force adjustment member 211 sets a thrust load, with which the opposing member 207 is pressed toward the opposing member 208. In the present embodiment, the pressing force adjustment member 211 is formed using the solenoid. The pressing force adjustment member 211 includes the casing 211b and the rod 211a. The rod 211a projects from the casing 211b.

The rod 211a is configured so that a projecting amount from the casing 211b can be changed by a drive source accommodated in the casing 211b, such as an electromagnet. The rod 211a applies a pressing force to the opposing member 207 in correspondence with the projecting amount from the casing 211b.

The positions may be switched between first electric motor 3 and the second brake mechanism 11C.

The schematic structure of the electromechanical actuator 1C has been described. The operation of the electromechanical actuator 1C will now be described. More specifically, (A) a normal operation using the first electric motor 3, (B) an operation when the first motion conversion mechanism 6 is jammed, and (C) an operation when the second motion conversion mechanism 8 is jammed will be described.

(A) Normal Operation Using First Electric Motor

Figure 15:
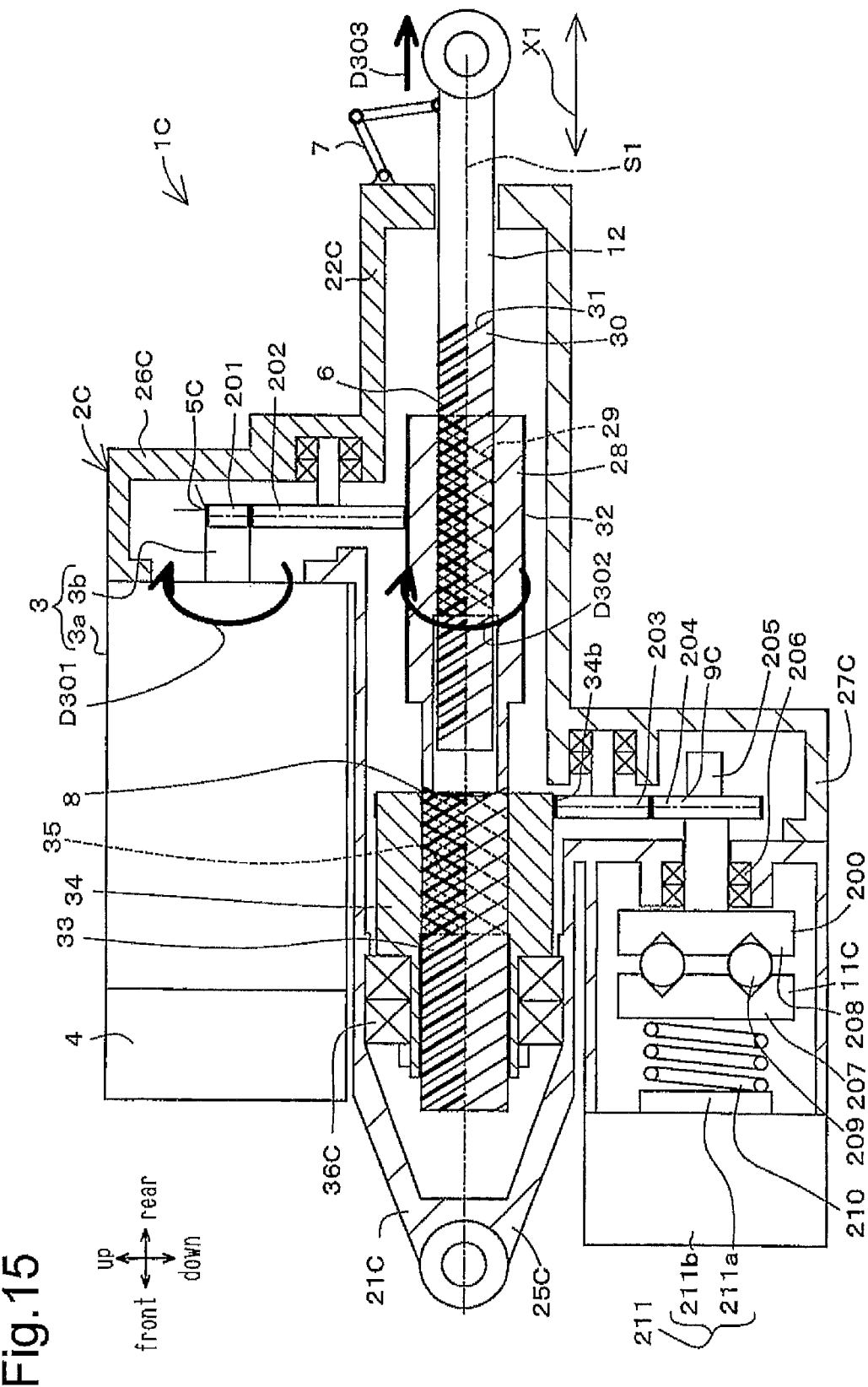
FIG. 15 is a diagram illustrating the normal operation of the electromechanical actuator of the fourth embodiment when the first electric motor is driven.

FIG. 15 is a diagram illustrating the normal operation of the electromechanical actuator 1C when the first electric motor 3 is driven. Referring to FIG. 15, in the normal operation using the first electric motor 3, the first motion conversion mechanism 6 operates in a state that the third shaft 34 of the second motion conversion mechanism 8 is locked by the torque limiter 200. This moves the output portion 12 in the axial direction X1.

More specifically, in the torque limiter 200, the pressing force adjustment member 211 presses the opposing members 207, 208. This disables the relative rotation of the opposing members 207, 208, which are coupled to each other with the balls 209 located in between. Thus, the rotation of the gear 204, which is coupled to the opposing member 207, is restricted. This locks the third shaft 34. That is, the rotation of the third shaft 34 is restricted.

Under this situation, when the first electric motor 3 operates, the rotation (e.g., indicated by the arrow D301 in FIG. 15) of the output shaft 3b of the first electric motor 3 is transmitted to the first shaft 28 through the first force transmission mechanism 5C. This rotates the first shaft 28 around the center axis S1 in the direction indicated by the arrow D302 in FIG. 15. When the first shaft 28 rotates, the rotation of the first member 29 is converted to the linear movement of the second member 31. This moves the output portion 12, which is formed integrally with the second member 31, in the axial direction X1 (e.g., direction indicated by the arrow D303 in FIG. 15).

In this case, the rotation of the fourth member 35 (third shaft 34) is restricted. Thus, the third member 33 rotates relative to the fourth member 35 (third shaft 34) and moves in the axial direction X1. More specifically, the output portion 12 moves in the axial direction X1 by the total amount of the axial movement of the output portion 12 when the first member 29 of the first motion conversion mechanism 6 rotates relative to the second member 31, and the axial movement of the first shaft 28 when the third member 33 of the second motion conversion mechanism 8 rotates relative to the fourth member 35.

(B) Operation when First Motion Conversion Mechanism is Jammed

Figure 16:
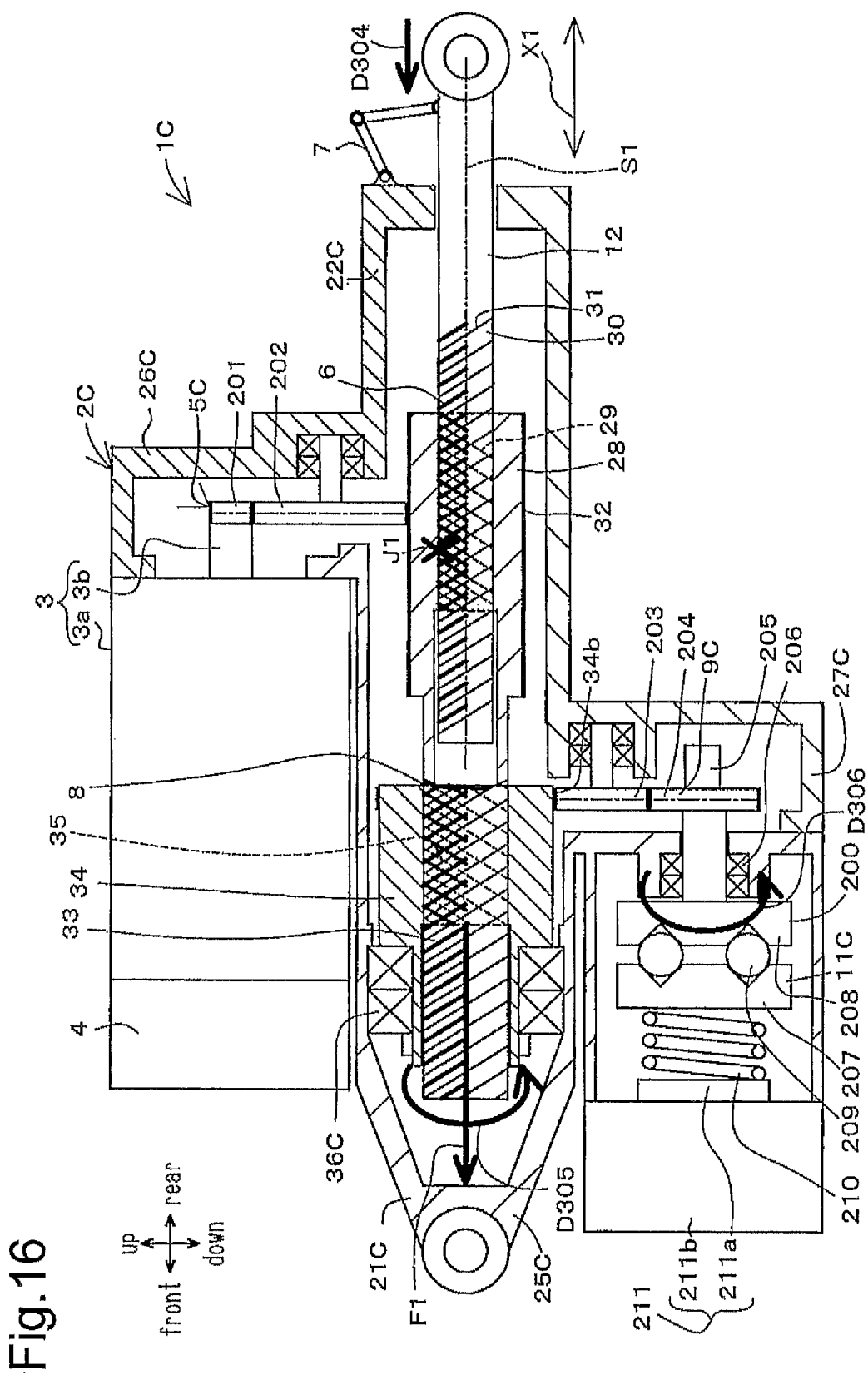
FIG. 16 is a diagram illustrating the operation of the electromechanical actuator of the fourth embodiment when the first motion conversion mechanism is jammed.

FIG. 16 is a diagram illustrating the operation of the electromechanical actuator 1C when the first motion conversion mechanism 6 is jammed. Referring to FIG. 16, when the first motion conversion mechanism 6 is jammed, the second brake mechanism 11 releases the lock. This allows force applied from the outside of the electromechanical actuator 1C to move the output portion 12 in the axial direction X1.

More specifically, jamming may occur in the first motion conversion mechanism 6, for example, when a foreign material is caught between the first member 29 and the second member 31 (jammed location is indicated by the symbol J1 in FIG. 16). This disables the relative movement of the first and second members 29, 31. As a result, the axial movement of the output portion 12 is disabled. However, when force is input from the flight control surface 102 to the output portion 12, the output portion 12 acts to move in the axial direction X1. Consequently, the second shaft 30 acts to move integrally with the first shaft 28 in the axial direction X1 (e.g., direction of the arrow D304 in FIG. 16).

As a result, a thrust force F1 shown in FIG. 16 is applied to the third shaft 34 from the first shaft 28. The thrust force F1 acts on the third shaft 34 as force acting to rotate the third shaft 34, for example, in a direction of the arrow D305 in FIG. 16. However, such a rotational force of the third shaft 34 caused by the thrust force F1 is received by the torque limiter 200.

Then, when the thrust force F1 acting on the third shaft 34 from the first shaft 28 reaches or exceeds a predetermined value, the rotational force of the third shaft 34 causes force acting between the opposing members 207, 208 of the torque limiter 200 to exceed the urging force of the spring member 210. Thus, the opposing member 207 compresses the spring member 210. This increases the distance between the opposing members 207, 208. The balls 209 held between the opposing members 207, 208 roll between the opposing members 207, 208. The opposing member 208 rotates freely relative to the opposing member 207 as indicated by the arrow D306 in FIG. 16. This allows the third shaft 34 (fourth member 35) to rotate around the first shaft 28. Consequently, the first shaft 28 (output portion 12) moves in the axial direction X1. Thus, the output portion 12 is movable in the axial direction X1 even when jamming occurs.

(C) Operation when Second Motion Conversion Mechanism is Jammed

Figure 17:
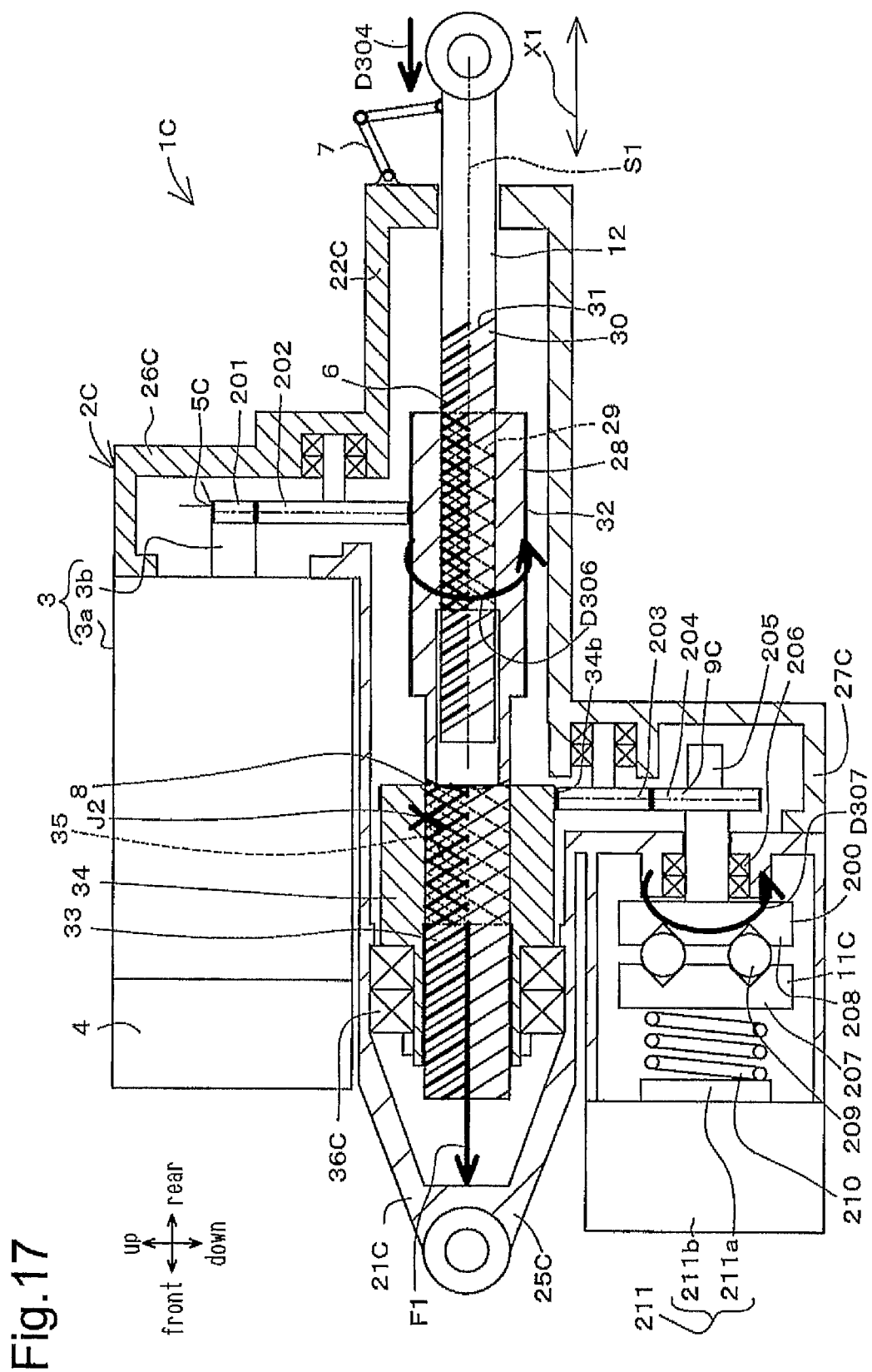
FIG. 17 is a diagram illustrating the operation of the electromechanical actuator of the fourth embodiment when the second motion conversion mechanism is jammed.

FIG. 17 is a diagram illustrating the operation of the electromechanical actuator 1C when the second motion conversion mechanism 8 is jammed. Referring to FIG. 17, when the second motion conversion mechanism 8 is jammed, the torque limiter 200 releases the lock. This allows force applied from the outside of the electromechanical actuator 1C to move the output portion 12 in the axial direction X1.

More specifically, jamming may occur in the second motion conversion mechanism 8, for example, when a foreign material is caught between the third member 33 and the fourth member 35 (jammed location is indicated by the symbol J2 in FIG. 17). This disables the relative movement of the third and fourth members 33, 35. As a result, the axial movement of the output portion 12 is disabled. However, when force is input from the flight control surface 102 to the output portion 12, the output portion 12 acts to move in the axial direction X1. Consequently, the second shaft 30 acts to move integrally with the first shaft 28 in the axial direction X1 (e.g., direction of the arrow D304 in FIG. 17).

As a result, a thrust force F1 shown in FIG. 17 is applied to the second shaft 30 from the first shaft 28. The thrust force F1 acts on the first shaft 28 as force acting to rotate the first shaft 28, for example, in a direction of the arrow D306 in FIG. 17. However, the thrust force F1 is received by the torque limiter 200 through the second motion conversion mechanism 8 and the second force transmission mechanism 9C.

Then, when the thrust force F1 acting on the third shaft 34 from the first shaft 28 reaches or exceeds a predetermined value, the rotational force of the third shaft 34 causes force acting between the opposing members 207, 208 of the torque limiter 200 to exceed the urging force of the spring member 210. Thus, the opposing member 207 compresses the spring member 210. This increases the distance between the opposing members 207, 208. The balls 209 held between the opposing members 207, 208 roll between the opposing members 207, 208. The opposing member 208 rotates freely relative to the opposing member 207 as indicated by the arrow D307 in FIG. 17. This allows the third shaft 34 the first shaft 28 to rotate around the center axis S1. Consequently, the first member 29 of the first shaft 28 rotates relative to the second member 31 of the second shaft 30. This moves the second shaft 30 (output portion 12) in the axial direction X1. Thus, the output portion 12 is movable in the axial direction X1 even when jamming occurs.

As described above, in the electromechanical actuator 1C of the present embodiment, the torque limiter 200 is configured to be capable of changing the predetermined value, which serves as the maximum torque value that restricts the relative rotation of the opposing members 207, 208. In this structure, when the first member 29 and the second member 31 are locked, torque exceeding the predetermined value may be applied between the third member 33 and the fourth member 35 through the first member 29 and the second member 31. In such a case, the relative movement of the third member 33 and the fourth member 35 can move the first member 29 and the second member 31 in the axial direction X1. This limits an excessive force input to each of the motion conversion mechanisms 6, 8.

In the electromechanical actuator 1C, when the torque acting between the third member 33 and the fourth member 35 is less than the predetermined value, the relative movement of the third member 33 and the fourth member 35 is restricted. As a result, the second member 31 can be moved in the axial direction X1 when the first member 29 and the second member 31 move relative to each other. When the torque acting between the third member 33 and the fourth member 35 is greater than or equal to the predetermined value, the relative movement of the third member 33 and the fourth member 35 is allowed. This allows the axial movement of the third member 33 when the fourth member 35 rotates, thereby limiting an excessive load applied to the third member 33 and the fourth member 35. This also limits an excessive load applied to the flight control surface 102 and a portion to which the electromechanical actuator 1C is coupled.

The electromechanical actuator 1C adjusts a pressing force applied from the pressing force adjustment member 211 to the spring member 210. This sets the maximum value (predetermined value) of the torque acting between the third member 33 and the fourth member 35.

The maximum value (predetermined value) of the torque acting between the third member 33 and the fourth member 35 can be set using a simple structure in which a solenoid is used as the pressing force adjustment member 211.

To ensure the redundancy, a plurality of electromechanical actuators 10 may be arranged in one flight control surface 102. In this case, when one of the electromechanical actuators 10 is jammed, another electromechanical actuator 10 can drive the flight control surface 102. In this case, the controller can reduce a load applied to the electromechanical actuator 1C driving the flight control surface 102 by operating the pressing force adjustment member 211 of the jammed electromechanical actuator 10, more specifically, by changing the projecting amount of the rod 211a.

Fifth Embodiment

Figure 18:
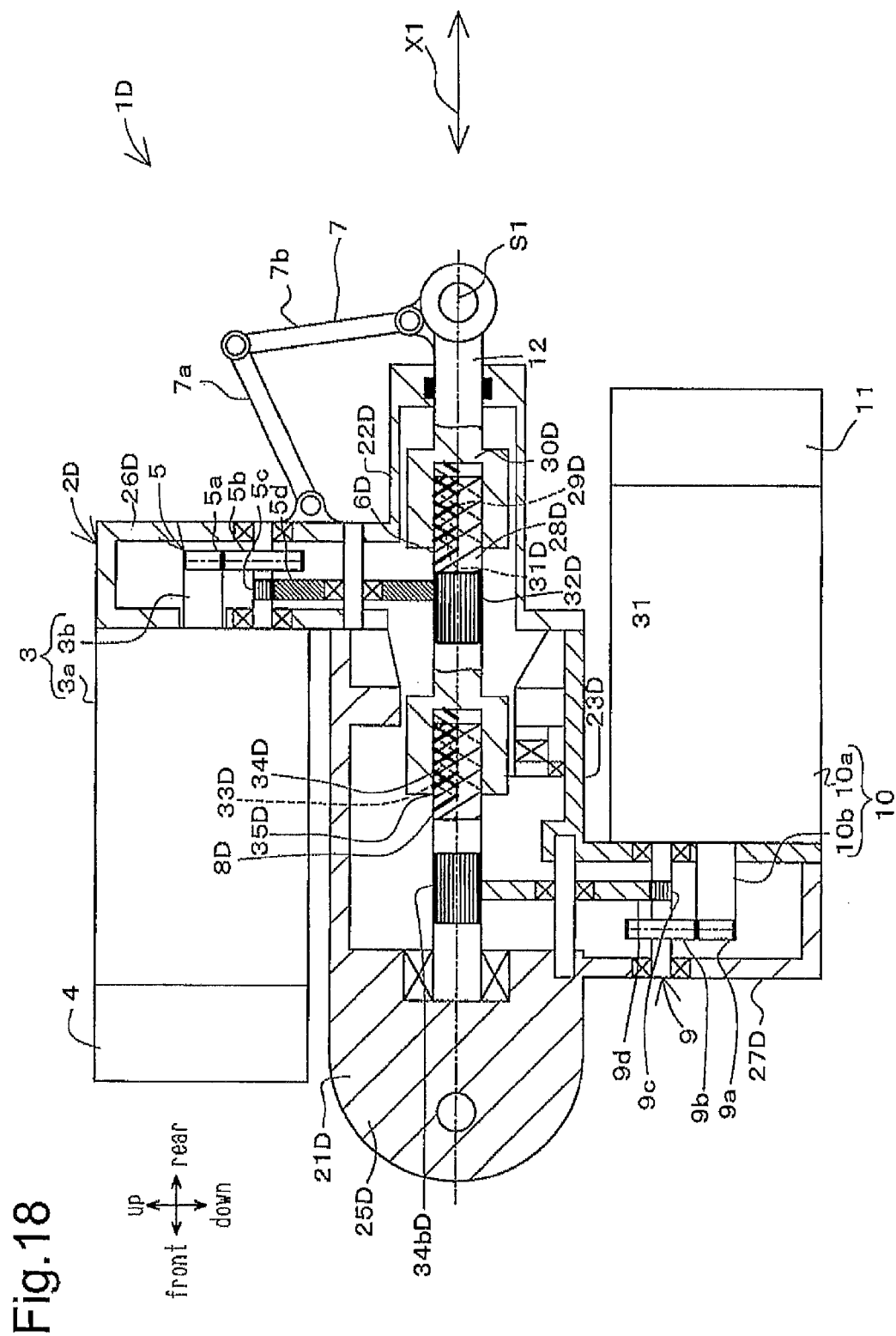
FIG. 18 is a partially cross-sectional schematic side view of an electromechanical actuator according to a fifth embodiment of the present invention.

FIG. 18 is a partially cross-sectional schematic side view of an electromechanical actuator 1D according to a fifth embodiment of the present invention. Referring to FIG. 18, in the present embodiment, a first motion conversion mechanism 6D uses a screw as a first member 29D, which is rotated by the first electric motor 3. A second motion conversion mechanism 8D uses a nut as a third member 33D, which is movable integrally with the first member 29D.

The electromechanical actuator 1D of the present embodiment includes the first electric motor 3, the first brake mechanism 4, the first force transmission mechanism 5, the first motion conversion mechanism 6D, the rotation stop mechanism 7, the second motion conversion mechanism 8D, the second force transmission mechanism 9, the second electric motor 10, and the second brake mechanism 11.

The first motion conversion mechanism 6D includes a first shaft 28D, the first member 29D functioning as a first screw, a second shaft 30D, and a second member 31D functioning as a first nut that is fastened to the first member 29D.

The first member 29D is a male thread member formed on one end of the first shaft 28D. The outer circumference of the first shaft 28D includes a spur teeth portion 32D. The second member 31D is a nut member that is formed on one end of the second shaft 30D and fastened to the first member 29D.

The second motion conversion mechanism 8D includes the third member 33D and a fourth member 35D. The third member 33D functions as a second nut configured to be movable integrally with the first member 29D. The fourth member 35D functions as a second screw that is fastened to the third member 33D.

The third member 33D is a nut member formed on the other end of the first shaft 28D. The fourth member 35D is a male thread member that is formed on the third shaft 34D and fastened to the third member 33D. The fourth member 35D (third shaft 34D) is connected to the second electric motor 10 and the second brake mechanism 11 via the second force transmission mechanism 9.

In this structure, the second brake mechanism 11 is configured to be capable of selectively performing an operation that restricts rotation of the fourth member 35D when the third member 33D moves, and an operation that allows the rotation of the fourth member 35D when the third member 33D moves.

This structure also obtains the same advantages as the first embodiment.

The embodiments of the present invention have been described. However, the present invention is not limited to the above embodiments and may be embodied in many other specific forms without departing from the spirit or scope of the present invention. For example, the present invention may be embodied in the following modified examples.

(I) The above embodiments describe an example in which the first to fourth members are screws and nuts. However, there is no limit to this configuration. For example, as shown in FIG. 19, each motion conversion mechanism may be a ball screw mechanism. In this case, a first member 29E of a first motion conversion mechanism 6E is a female-threaded groove helically formed in the first shaft 28. A second member 31E is a male-threaded groove helically formed in the second shaft 30. A plurality of balls 80 functioning as rolling elements are arranged between the first member 29E and the second member 31E. The balls 80 are configured to circulate through a groove portion between the first member 29E and the second member 31E.

Additionally, a third member 33E of a second motion conversion mechanism 8E is a male-threaded groove helically formed in the first shaft 28. A fourth member 35E is a female-threaded groove helically formed in the third shaft 34. A plurality of balls 81 functioning as rolling elements are arranged between the third member 33E and the fourth member 35E. The balls 81 are configured to circulate through a groove portion between the third member 33E and the fourth member 35E.

(II) As shown in FIG. 20, motion conversion mechanisms 6F, 8F, which are roller screw mechanisms, may be used instead of the motion conversion mechanisms 6, 8.

The first motion conversion mechanism 6F includes a plurality of first members 29F, a second member 31F, and a plurality of rollers 83. The first members 29F are each a female-threaded groove helically formed in an inner circumference of the first shaft 28. The rollers 83 are arranged in the inner circumference of the first shaft 28 at equal intervals in the circumferential direction of the first shaft 28 (FIG. 20 shows only one roller 83). Each roller 83 includes a male-threaded groove helically formed in the outer circumference. The rollers 83 mesh with the first members 29F and the second member 31F. Each roller 83 is capable of rotating around the center axis of the roller 83 and orbiting around the center axis S1. The second member 31F is a female-threaded groove helically formed in the outer circumference of the second shaft 30.

The second motion conversion mechanism 8F includes a third member 33F, a fourth member 35F, and a plurality of rollers 84. The third member 33F is a male-threaded groove helically formed in the outer circumference of the first shaft 28. The rollers 84 are arranged in the inner circumference of the third shaft 34 at equal intervals in the circumferential direction of the third shaft 34 (FIG. 20 shows only one roller 84). Each roller 84 includes a male-threaded groove helically formed in the outer circumference. Each roller 84 meshes with the third member 33F and the fourth member 35F. Each roller 84 is capable of rotating around the center axis of the roller 84 and orbiting around the center axis S1. The fourth member 35F is a female-threaded groove helically formed in the inner circumference of the third shaft 34.

(III) The above embodiments describe an example of a speed summing operation that increases an amount in the movement of the output portion 12 using the motion conversion mechanisms 6, 8 by driving the first electric motor 3 and the second electric motor 10. However, there is no limit to this configuration. For example, the output portion 12 may be configured to move in one direction when the first motion conversion mechanism 6 is operated by driving the first electric motor 3, and in the opposite direction when the second motion conversion mechanism 8 is operated by driving the second electric motor 10. In this case, the output portion 12 performs a speed subtraction operation. In the speed subtraction operation, the output portion 12 moves in the axial direction by an amount obtained by subtracting the movement of the output portion 12 when the first electric motor 3 is driven, from the movement of the output portion 12 when the second electric motor 10 is driven.

(IV) The embodiment using the torque limiter describes an example of a torque limiter that includes two opposing members and balls arranged between the opposing members. However, there is no limit to this configuration. For example, the torque limiter may be replaced by a different mechanism, such as a skew brake.

(V) The above embodiments describe an example of an electromechanical actuator used for aircraft. However, there is no limit to this configuration. The present invention may be applied in a field other than aircraft.

The present examples and embodiments are to be considered as illustrative and not restrictive, and the invention is not to be limited to the details given herein, but may be modified within the scope and equivalence of the appended claims.

INDUSTRIAL APPLICABILITY

The present invention may be widely applied to an electromechanical actuator including a motion conversion mechanism that converts a rotational drive force, which is output by an electric motor, to a linear drive force and outputs the linear drive force.

The invention claimed is:
1. An electromechanical actuator comprising:
   a first electric motor;
   a first motion conversion mechanism;
   a second motion conversion mechanism; and
   a rotation restriction mechanism for the second motion conversion mechanism, wherein:
   the first motion conversion mechanism includes a first screw and a first nut that is fastened to the first screw;
   the second motion conversion mechanism includes a second screw and a second nut that is fastened to the second screw;
   the first motion conversion mechanism includes
      a first member that includes one of the first screw and the first nut, the first member being rotated by an output of the first electric motor, and
      a second member that includes the other of the first screw and the first nut;
   the second motion conversion mechanism includes
      a third member that includes one of the second screw and the second nut, the third member being movable integrally with the first member, and
      a fourth member that includes the other of the second screw and the second nut; and
   the rotation restriction mechanism is configured to be capable of selectively performing
      an operation that restricts rotation of the fourth member when the third member moves, and
      an operation that allows rotation of the fourth member when the third member moves.
2. The electromechanical actuator according to claim 1, wherein each motion conversion mechanism is formed using one of a roller screw and a ball screw.
3. The electromechanical actuator according to claim 1, further comprising:
   a gear that is rotated when receiving the output of the first electric motor; and
   teeth that are configured to mesh with the gear and rotate integrally with the first member,
      wherein the teeth form splines extending in an axial direction of the first member.
4. The electromechanical actuator according to claim 1, further comprising a rotation stop mechanism that restricts rotation of the second member.
5. The electromechanical actuator according to claim 1, further comprising a hollow first shaft, wherein the first shaft includes the first member and the third member that are arranged in a straight line.
6. The electromechanical actuator according to claim 5, further comprising:
   a second shaft that is inserted into the first shaft; and
   a third shaft that surrounds the first shaft, wherein
   the first nut that functions as the first member and the first screw that functions as the second member are respectively arranged on an inner circumference of the first shaft and an outer circumference of the second shaft, and
   the second screw that functions as the third member and the second nut that functions as the fourth member are respectively arranged on an outer circumference of the first shaft and an inner circumference of the third shaft.
7. The electromechanical actuator according to claim 1, further comprising:
   a housing that accommodates the fourth member; and
   a bearing unit that is held by the housing and supports the fourth member, wherein the bearing unit includes a thrust bearing and a radial bearing that are coaxial with the fourth member.
8. The electromechanical actuator according to claim 1, further comprising a second electric motor that is capable of driving and rotating the fourth member.
9. The electromechanical actuator according to claim 8, further comprising a rotation restriction mechanism for the first motion conversion mechanism, the rotation restriction mechanism for the first motion conversion mechanism being arranged to restrict rotation of the first member.
10. The electromechanical actuator according to claim 1, wherein the rotation restriction mechanism for the second motion conversion mechanism includes a brake mechanism that is capable of restricting rotation of the fourth member.
11. The electromechanical actuator according to claim 10, wherein
   the brake mechanism of the rotation restriction mechanism for the second motion conversion mechanism includes a torque limiter that is capable of restricting rotation of the fourth member when torque acting on the fourth member is less than a predetermined value, and
   the torque limiter is configured to be capable of changing the predetermined value.
12. The electromechanical actuator according to claim 11, wherein
   the torque limiter includes two opposing members, which are opposed to each other, and a pressing force adjustment member,
   the two opposing members are coupled to the fourth member and the pressing force adjustment member,
   the two opposing members are configured to be coupled so that transmission of force between the two opposing members is allowed when torque acting between the two opposing members is less than a predetermined value,
   the two opposing members are configured to rotate freely relative to each other when the torque acting between the two opposing members is greater than or equal to the predetermined value, and the pressing force adjustment member is configured to be capable of adjusting a thrust load acting between the two opposing members.

13. The electromechanical actuator according to claim 12, further comprising a spring member located between one of the two opposing members and the pressing force adjustment member, wherein the pressing force adjustment member is configured to be capable of adjusting a pressing force that presses the spring member against the opposing member.

14. The electromechanical actuator according to claim 12, wherein the pressing force adjustment member includes a solenoid.

15. The electromechanical actuator according to claim 1, wherein
the rotation restriction mechanism for the second motion conversion mechanism further includes a second motion conversion mechanism torque limiter that is located between the first electric motor and the fourth member,
the second motion conversion mechanism torque limiter includes two second opposing members that are capable of transmitting force to the first electric motor and the fourth member,
the two second opposing members are configured to be coupled so that transmission of force between the two second opposing members is allowed when torque acting between the first electric motor and the fourth member is less than a predetermined value, and
the two second opposing members are configured to rotate freely relative to each other when the torque acting between the first electric motor and the fourth member is greater than or equal to the predetermined value.

16. The electromechanical actuator according to claim 15, further comprising a first motion conversion mechanism torque limiter located between the first electric motor and the first member, wherein
the first motion conversion mechanism torque limiter includes two first opposing members, one of which is coupled to the first electric motor and the other of which is coupled to the first member,
the two first opposing members are configured to be coupled so that transmission of force between the first opposing members is allowed when torque acting between the first electric motor and the first member is less than a predetermined value, and
the two first opposing members are configured to rotate freely relative to each other when the torque acting between the first electric motor and the first member is greater than or equal to the predetermined value.

* * * * *